US011061243B2

(12) United States Patent
Anazawa et al.

(10) Patent No.: US 11,061,243 B2
(45) Date of Patent: Jul. 13, 2021

(54) DICHROIC-MIRROR ARRAY

(71) Applicant: Hitachi High-Tech Corporation, Tokyo (JP)

(72) Inventors: Takashi Anazawa, Tokyo (JP); Motohiro Yamazaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 144 days.

(21) Appl. No.: 16/077,507

(22) PCT Filed: Feb. 22, 2016

(86) PCT No.: PCT/JP2016/055032
§ 371 (c)(1),
(2) Date: Aug. 13, 2018

(87) PCT Pub. No.: WO2017/145231
PCT Pub. Date: Aug. 31, 2017

(65) Prior Publication Data
US 2019/0064535 A1    Feb. 28, 2019

(51) Int. Cl.
*G02B 27/14* (2006.01)
*G01J 3/36* (2006.01)
(Continued)

(52) U.S. Cl.
CPC ............ *G02B 27/141* (2013.01); *G01J 3/021* (2013.01); *G01J 3/36* (2013.01); *G01J 3/51* (2013.01);
(Continued)

(58) Field of Classification Search
CPC .............. G02B 27/141; G02B 27/1006; G02B 27/145; G02B 27/14; G02B 27/142; G02B 5/208; G02B 5/26; G02B 27/1013; G02B 19/0028; G02B 27/1073; G02B 26/008; G02B 27/149; G02B 21/06; G02B 27/102; G02B 27/104; G02B 27/283; G02B 5/045; G02B 6/4215; G02B 19/0057;
(Continued)

(56) References Cited

U.S. PATENT DOCUMENTS 6,637,888 B1  10/2003  Haven
8,357,281 B2   1/2013  Pang et al.
(Continued)

FOREIGN PATENT DOCUMENTS

CN       1438514 A    8/2003
CN    201464352 U    5/2010
(Continued)

OTHER PUBLICATIONS

Chinese-language Office Action issued in Chinese Application No. 201680080052.1 dated Mar. 26, 2020 (11 pages).
(Continued)

*Primary Examiner* — Collin X Beatty
*Assistant Examiner* — Grant A Gagnon
(74) *Attorney, Agent, or Firm* — Crowell & Moring LLP

(57) ABSTRACT

A dichroic-mirror array in which a plurality of dichroic mirrors are arranged, and by satisfying a predetermined relationship between a width, a thickness, a material, a tilt, an interval, and a step difference of dichroic mirrors, the dichroic-mirror array is miniaturized, an optical path length is reduced, and at the same time, an aperture width is increased.

20 Claims, 20 Drawing Sheets

(51) Int. Cl.
*G01J 3/02* (2006.01)
*G01J 3/51* (2006.01)
*G02B 5/26* (2006.01)
*G02B 5/28* (2006.01)
*G02B 27/10* (2006.01)
*G01N 21/25* (2006.01)
*G02B 19/00* (2006.01)

(52) U.S. Cl.
CPC .............. *G01N 21/25* (2013.01); *G02B 5/26* (2013.01); *G02B 5/28* (2013.01); *G02B 19/0076* (2013.01); *G02B 27/10* (2013.01)

(58) Field of Classification Search
CPC .... G02B 23/12; G02B 27/0905; G02B 27/10; G02B 27/1033; G02B 27/144; G02B 5/0825; G02B 5/10; G02B 5/18; G02B 5/285; G02B 7/006; G02B 17/0694; G02B 19/0014; G02B 19/0076; G02B 1/11; G02B 23/04; G02B 23/2469; G02B 26/0816; G02B 27/1026; G02B 27/1053; G02B 27/1066; G02B 27/1086; G02B 27/126; G02B 27/148; G02B 27/30; G02B 5/08; G02B 5/124; G02B 5/20; G02B 5/23; G02B 5/282; G02B 6/02; G02B 6/29367; G02B 6/4246; G02B 13/14; G02B 17/002; G02B 17/02; G02B 17/0896; G02B 19/0019; G02B 19/0042; G02B 19/0047; G02B 19/0052; G02B 19/0061; G02B 19/009; G02B 1/00; G02B 1/005; G02B 2027/0178; G02B 21/0076; G02B 21/04; G02B 21/16; G02B 21/18; G02B 21/248; G02B 21/34; G02B 2207/123; G02B 23/08; G02B 23/2423; G02B 26/001; G02B 26/002; G02B 26/007; G02B 26/02; G02B 26/023; G02B 26/04; G02B 26/0833; G02B 27/0018; G02B 27/0025; G02B 27/0081; G02B 27/0101; G02B 27/017; G02B 27/0955; G02B 27/0977; G02B 27/0994; G02B 27/123; G02B 27/143; G02B 27/146; G02B 27/40; G02B 27/46; G02B 30/25; G02B 3/0037; G02B 3/08; G02B 5/008; G02B 5/0231; G02B 5/0294; G02B 5/04; G02B 5/0891; G02B 5/12; G02B 5/1866; G02B 5/201; G02B 5/203; G02B 5/205; G02B 5/206; G02B 5/22; G02B 5/28; G02B 5/283; G02B 5/286; G02B 5/289; G02B 5/3066; G02B 6/0001; G02B 6/0005; G02B 6/005; G02B 6/02033; G02B 6/02042; G02B 6/036; G02B 6/12011; G02B 6/12021; G02B 6/264; G02B 6/2817; G02B 6/29352; G02B 6/29362; G02B 6/29365; G02B 6/3512; G02B 6/3562; G02B 6/3586; G02B 6/4204; G02B 6/4206; G02B 6/4207; G02B 7/24; G01J 2003/1226; G01J 2003/1243; G01J 3/0208; G01J 3/0229; G01J 3/14; G01J 3/2823; G01J 3/32; G01J 3/36; G01J 3/443
USPC .......................................................... 359/634
See application file for complete search history.

(56) References Cited

U.S. PATENT DOCUMENTS

| | | |
|---|---|---|
| 2002/0154317 A1 | 10/2002 | Kempe |
| 2004/0075778 A1 | 4/2004 | Yamakawa |
| 2007/0121112 A1 | 5/2007 | Kato |
| 2010/0229650 A1 | 9/2010 | Shahzad et al. |
| 2011/0068007 A1 | 3/2011 | Pang et al. |
| 2017/0153009 A1 | 6/2017 | Moser et al. |

FOREIGN PATENT DOCUMENTS

| | | |
|---|---|---|
| CN | 101828102 A | 9/2010 |
| CN | 102033413 A | 4/2011 |
| CN | 202995141 U | 6/2013 |
| CN | 103996973 A | 8/2014 |
| CN | 105449513 A | 3/2016 |
| EP | 2 482 117 A1 | 8/2012 |
| EP | 2 966 490 A1 | 1/2016 |
| JP | 8-9101 A | 1/1996 |
| JP | 9-274166 A | 10/1997 |
| JP | 10-221647 A | 8/1998 |
| JP | 2002-517011 A | 6/2002 |
| JP | 3835089 B2 | 10/2006 |
| JP | 4109174 B2 | 7/2008 |
| JP | 2011-90036 A | 5/2011 |
| JP | 2012-242117 A | 12/2012 |
| WO | WO 99/61865 A1 | 12/1999 |

OTHER PUBLICATIONS

Extended European Search Report issued in counterpart European Application No. 16891390.3 dated Oct. 16, 2019 (eight pages).
International Search Report (PCT/ISA/210) issued in PCT Application No. PCT/JP2016/055032 dated Apr. 26, 2016 with English translation (four (4) pages).
Japanese-language Written Opinion (PCT/ISA/237) issued in PCT Application No. PCT/JP2016/055032 dated Apr. 26, 2016 (three (3) pages).
Chinese-language Office Action issued in Chinese Application No. 201680080052.1 dated Nov. 23, 2020 (13 pages).

[Fig. 1]
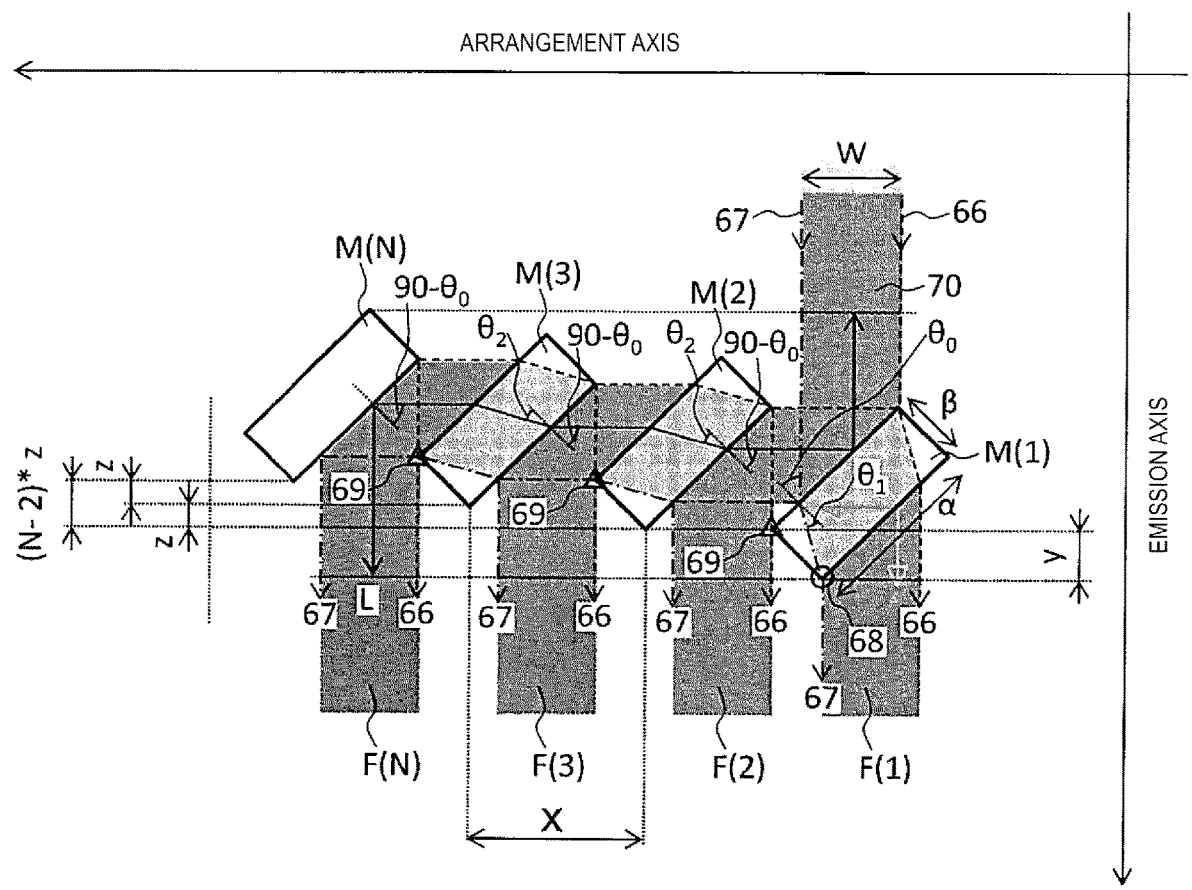

[Fig. 2]
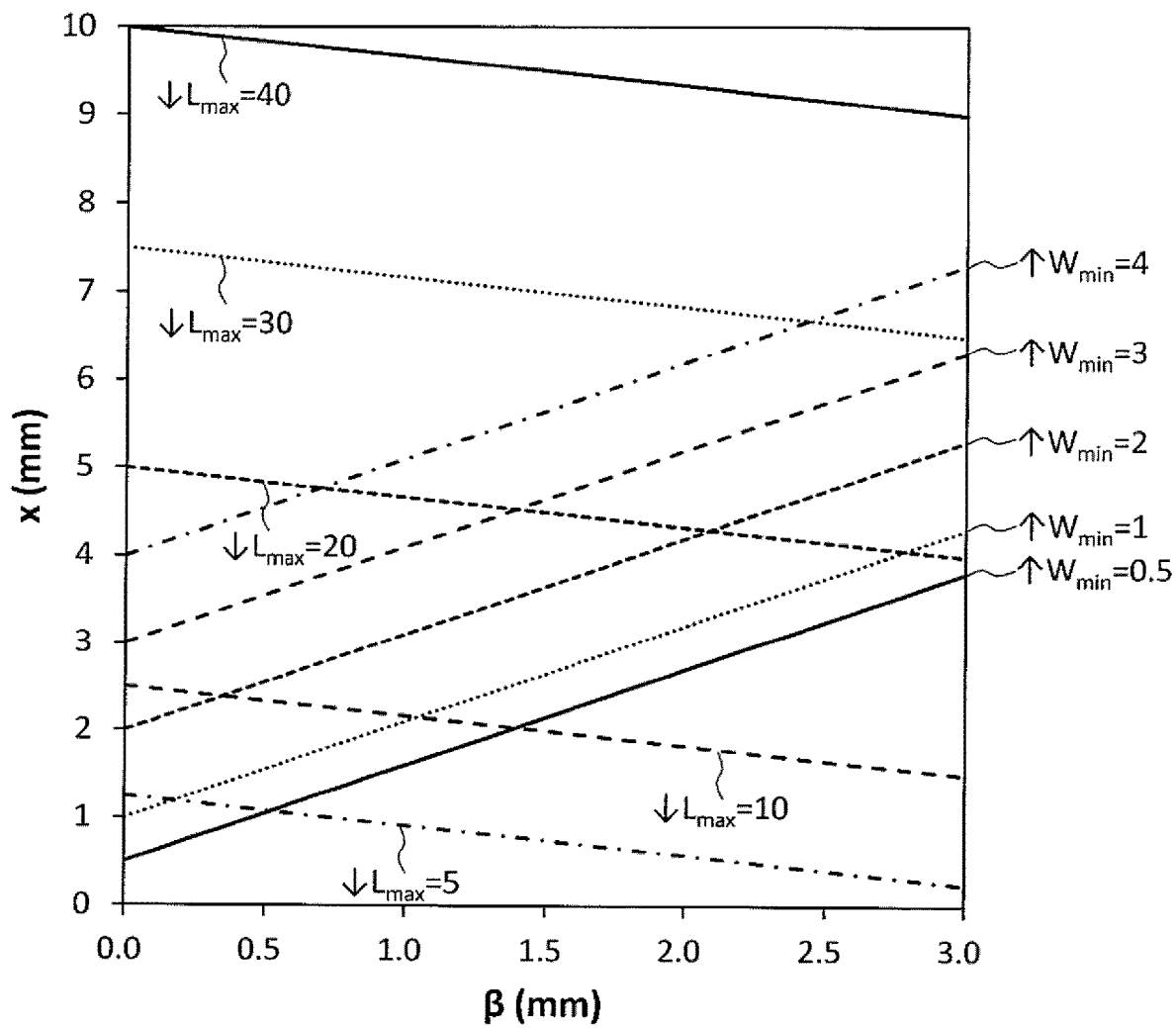

[Fig. 3]
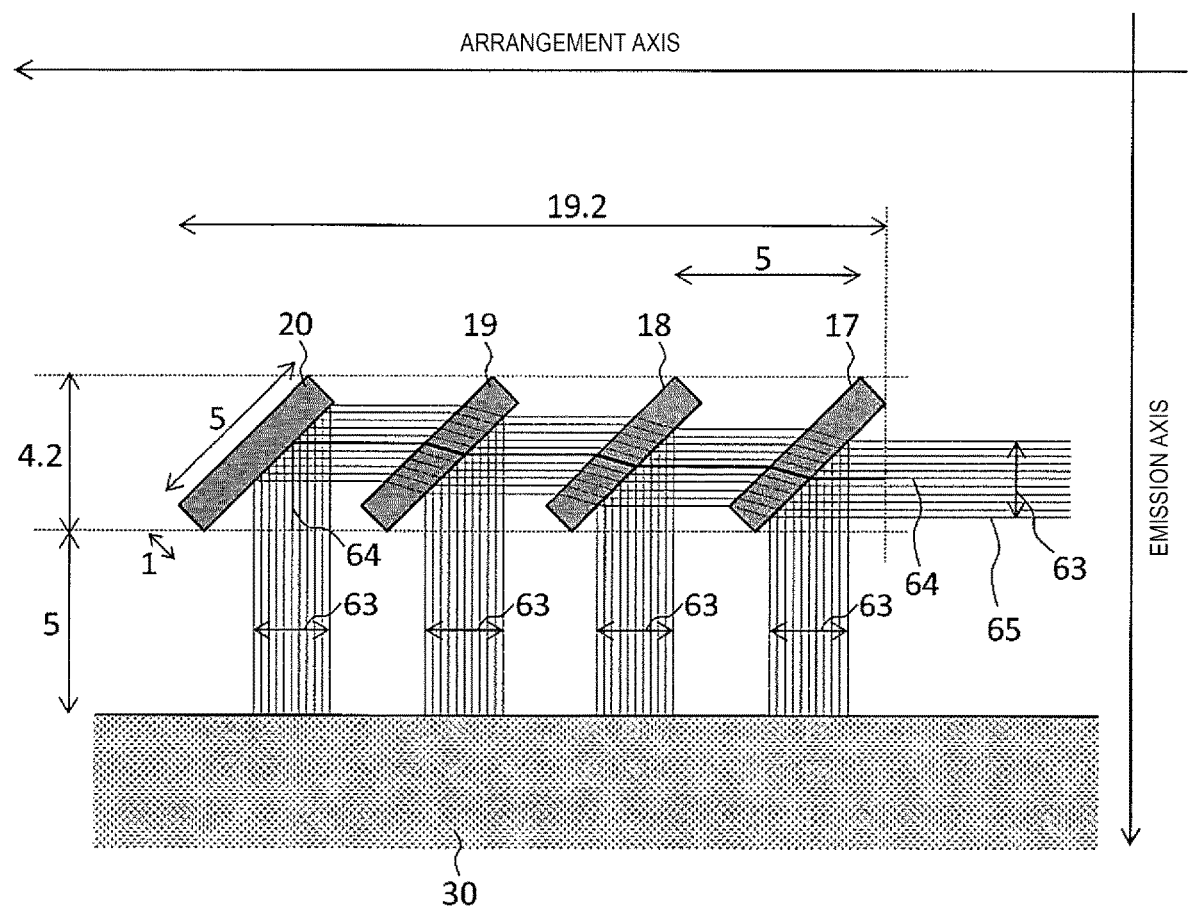

[Fig. 4]
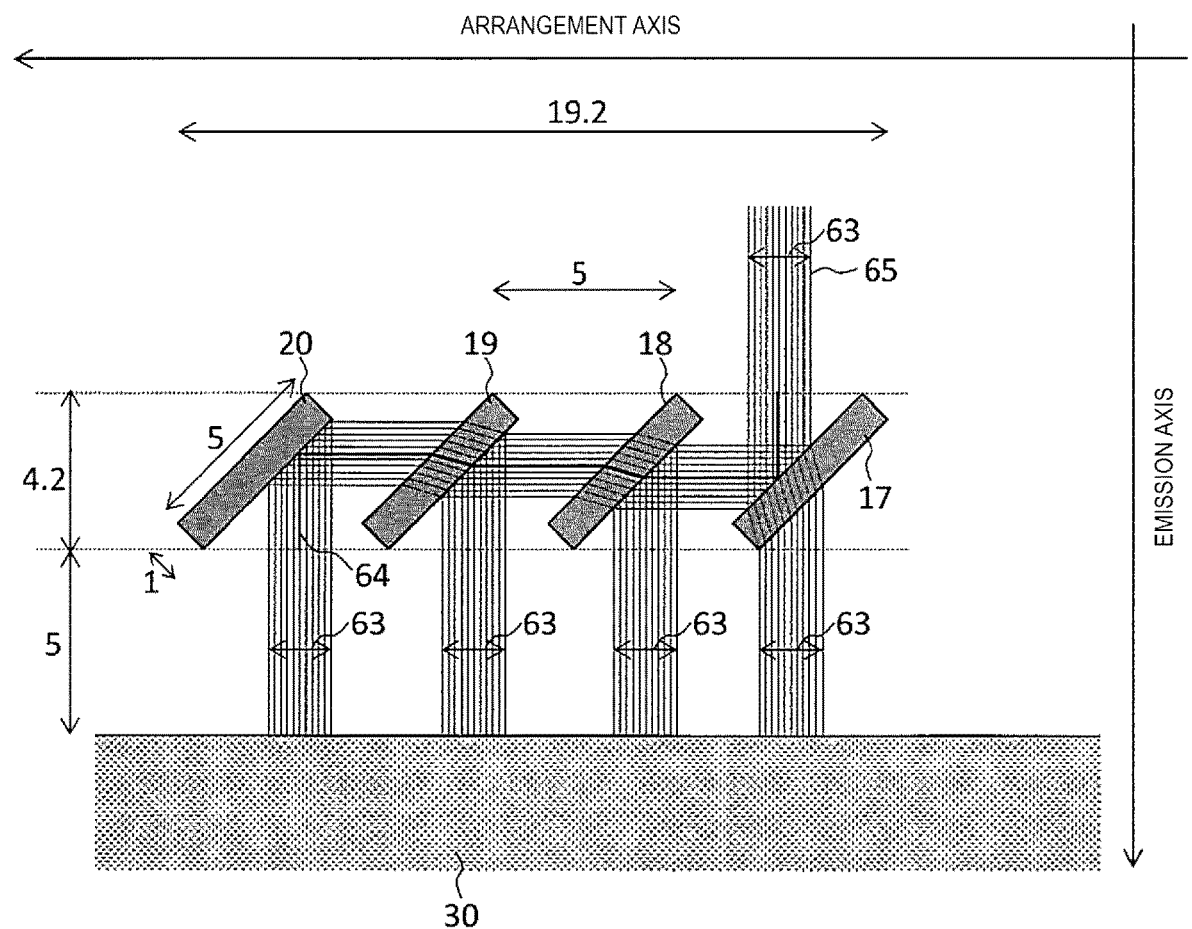

[Fig. 5]
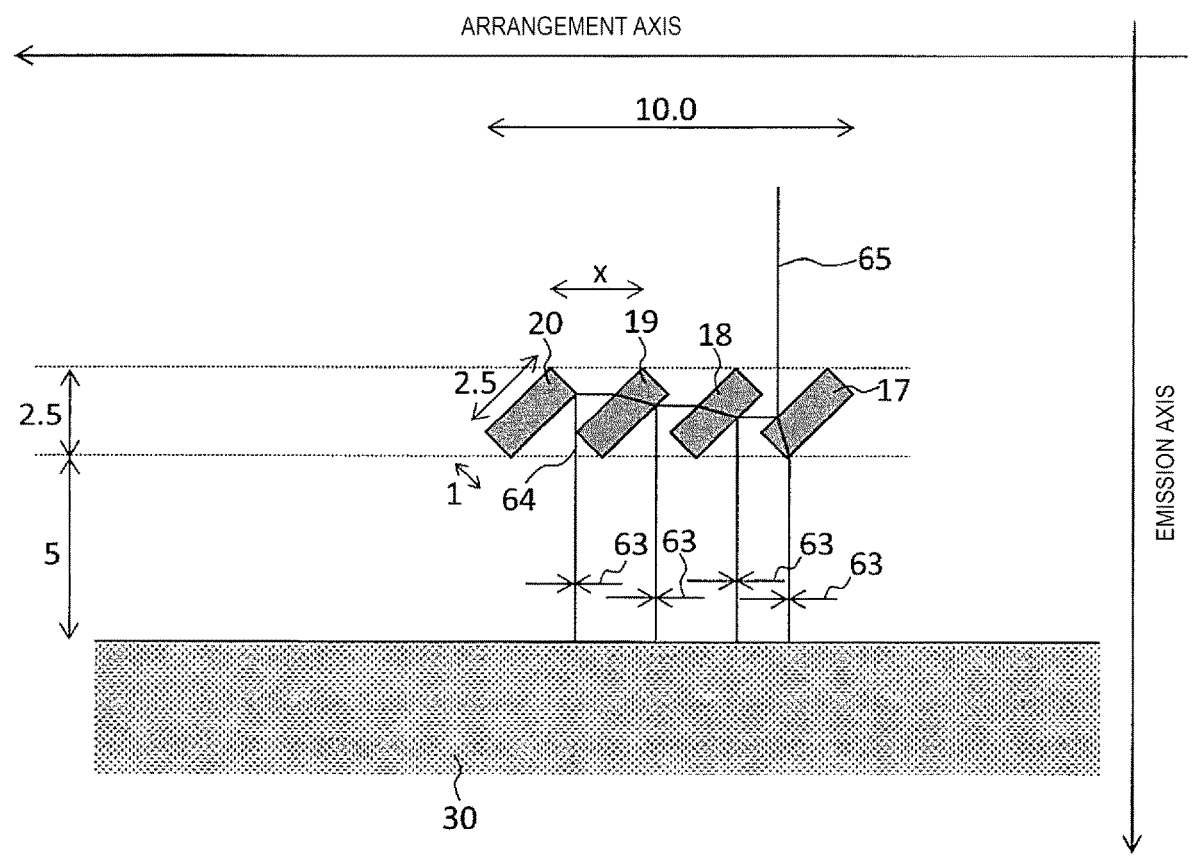

[Fig. 6]
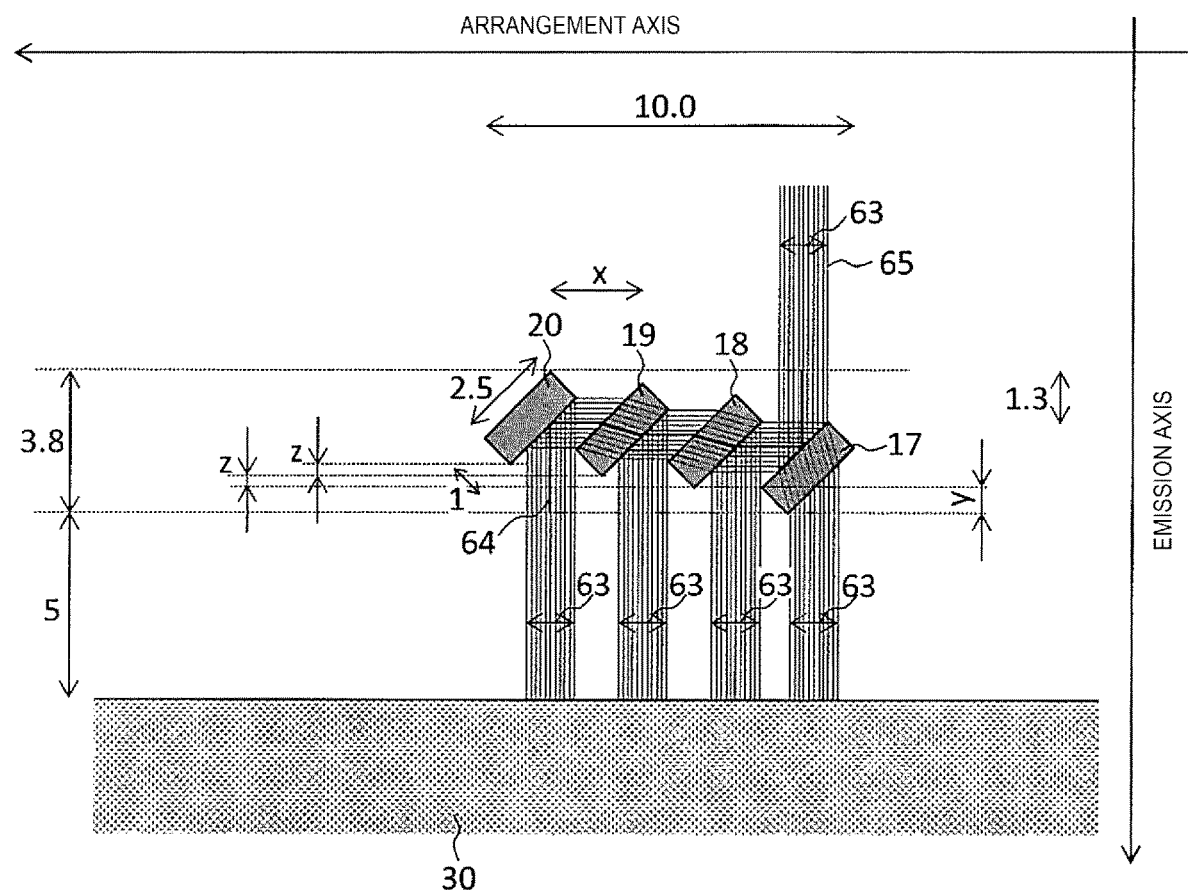

[Fig. 7]
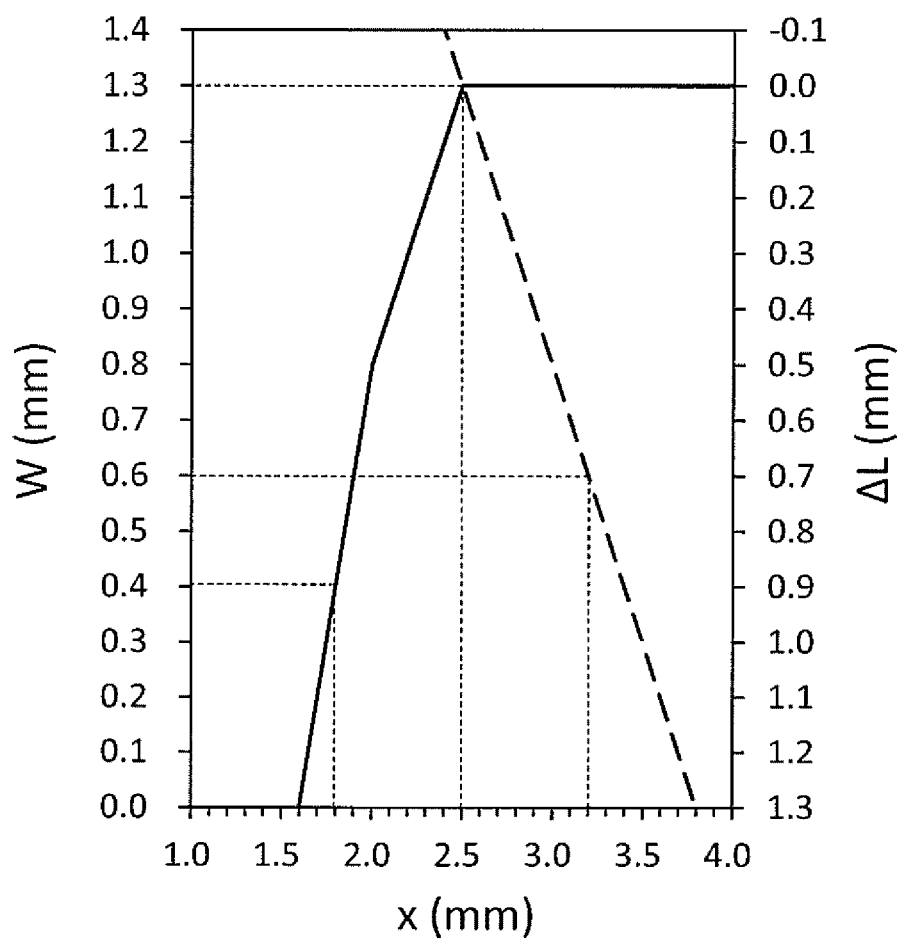

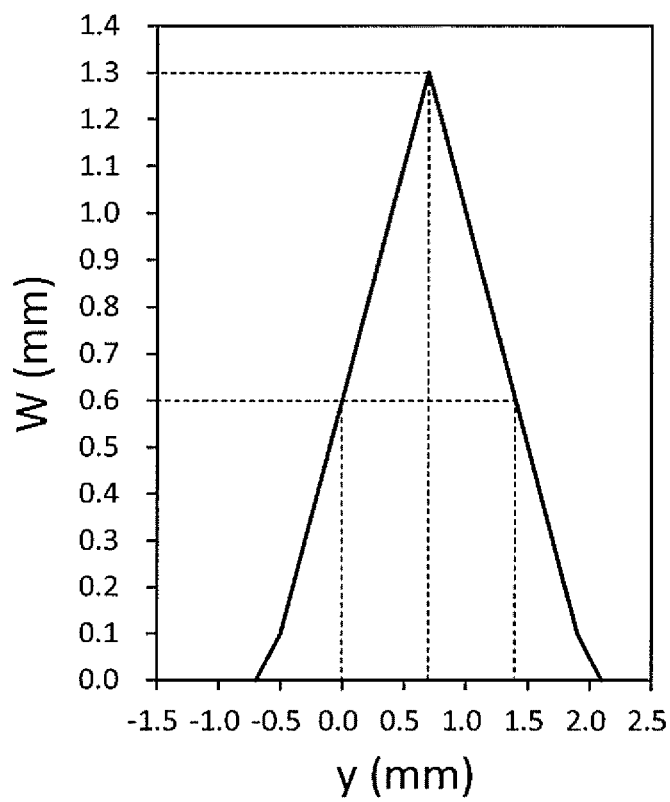
[Fig. 8A]
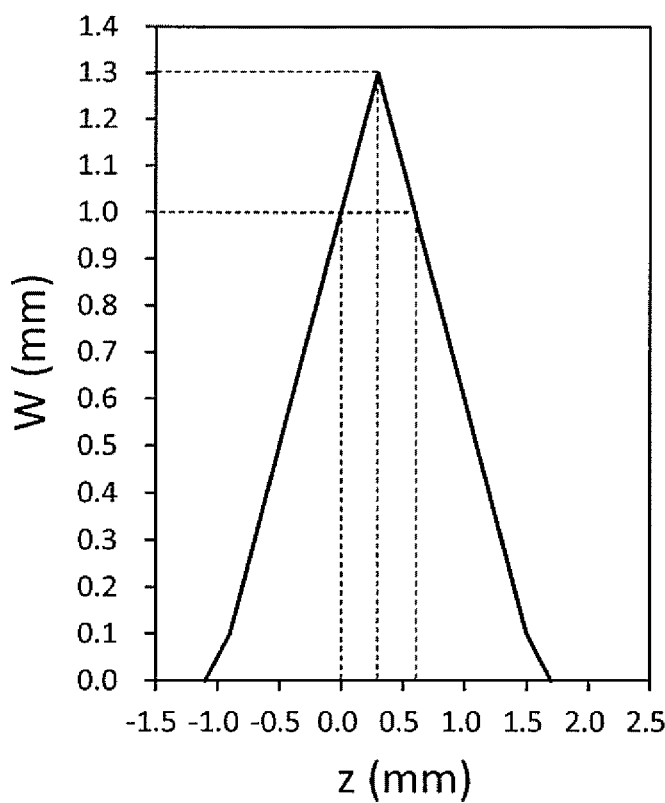
[Fig. 8B]

[Fig. 9]
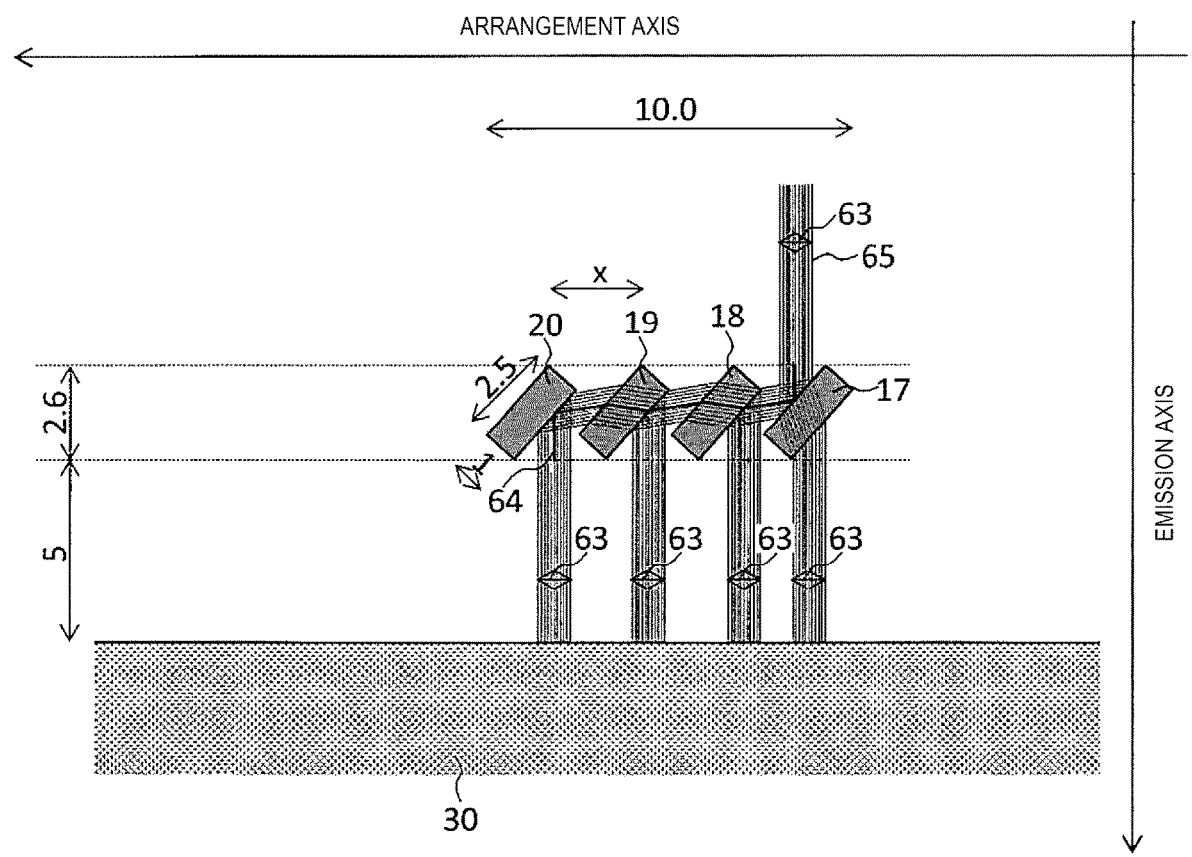

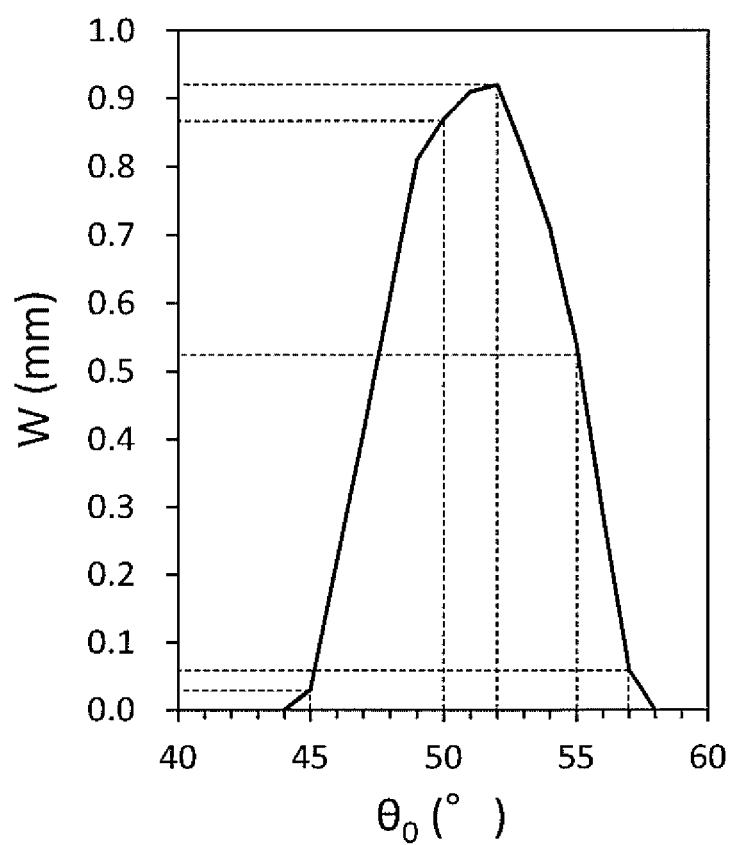
[Fig. 10]

[Fig. 11A]
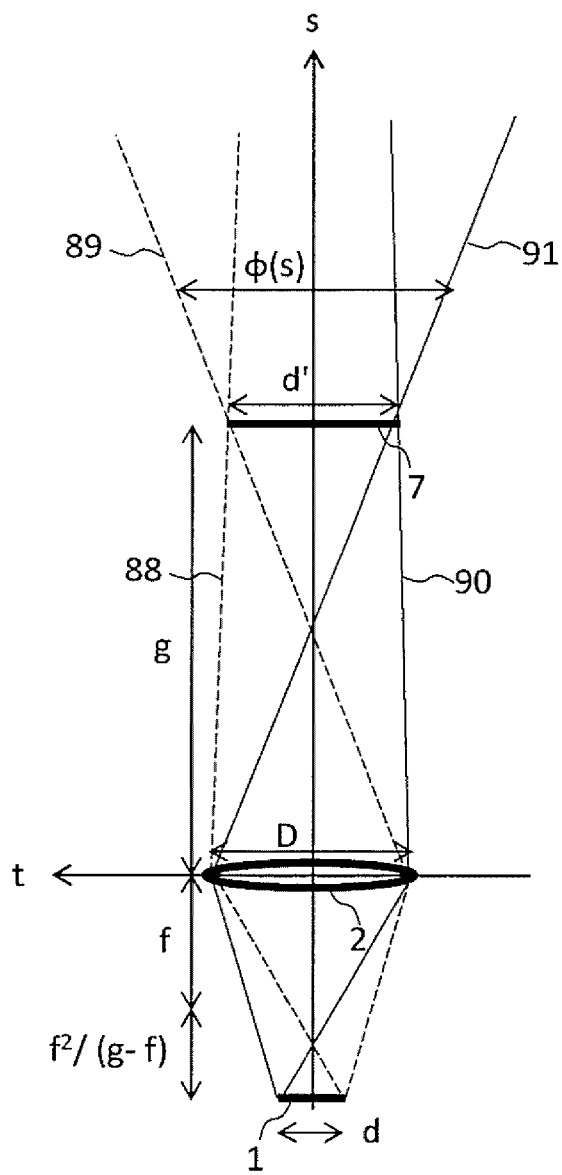
[Fig. 11B]
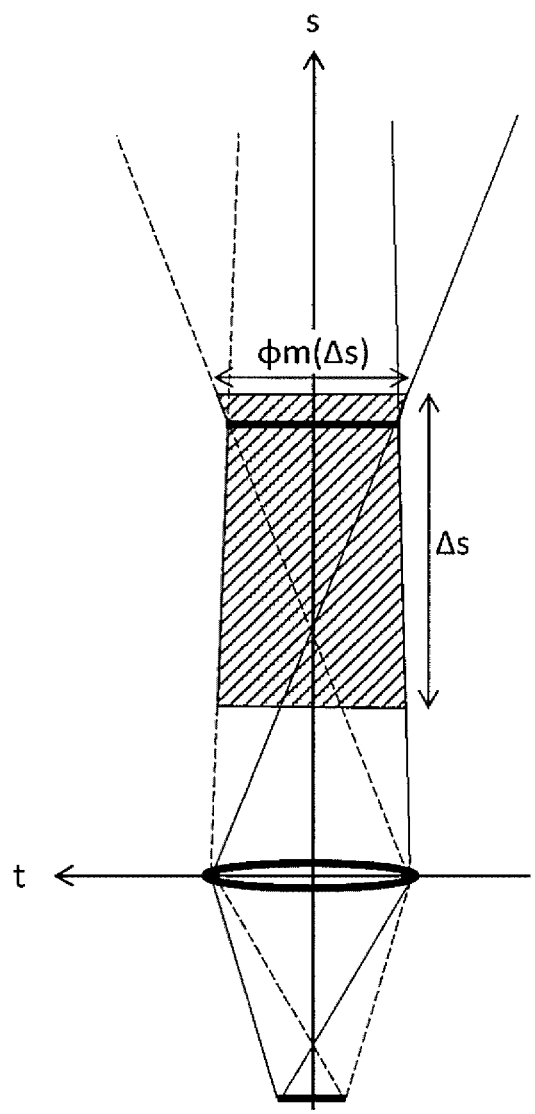

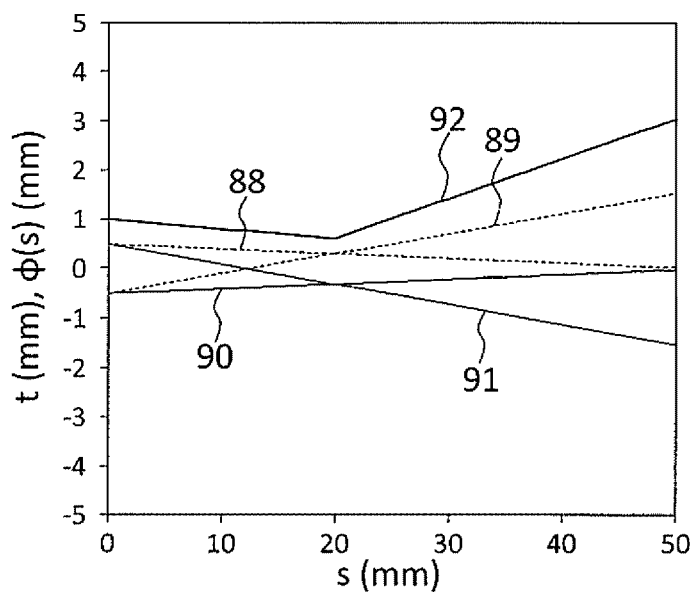
[Fig. 12A]
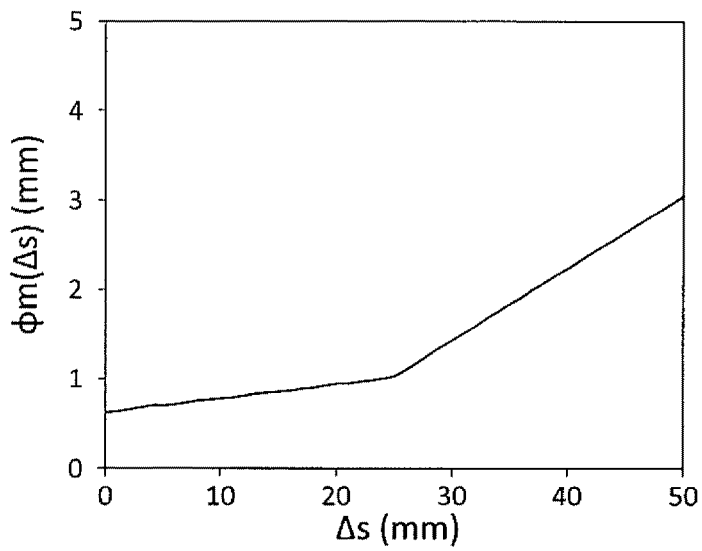
[Fig. 12B]
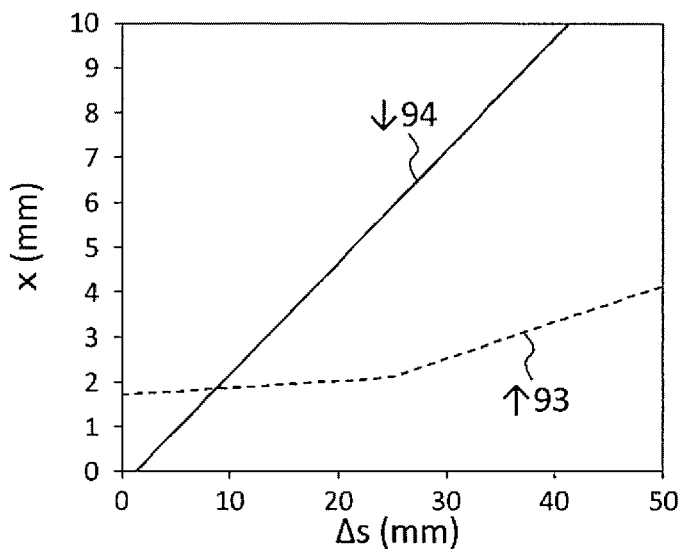
[Fig. 12C]

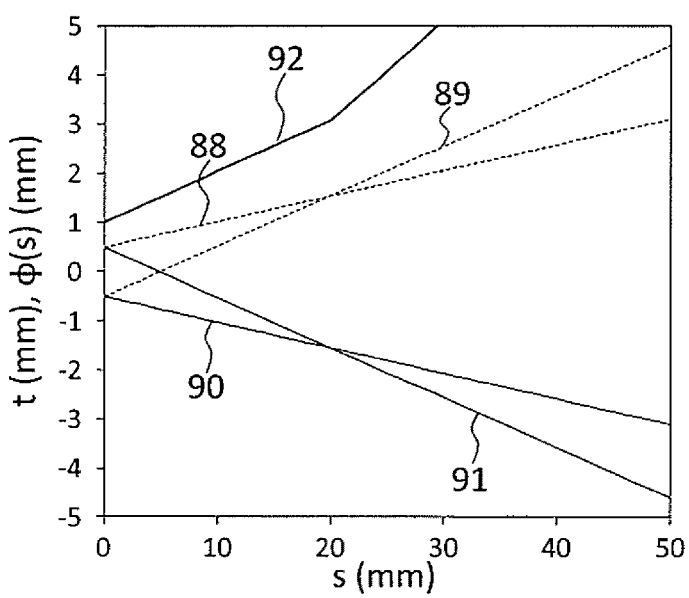
[Fig. 13A]
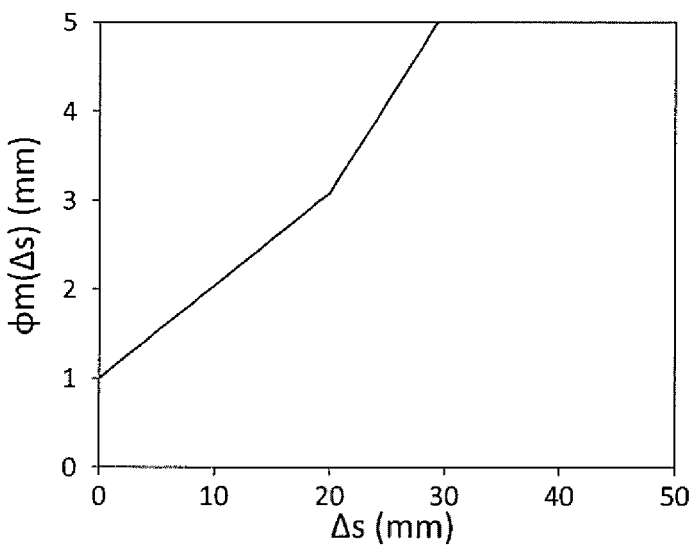
[Fig. 13B]
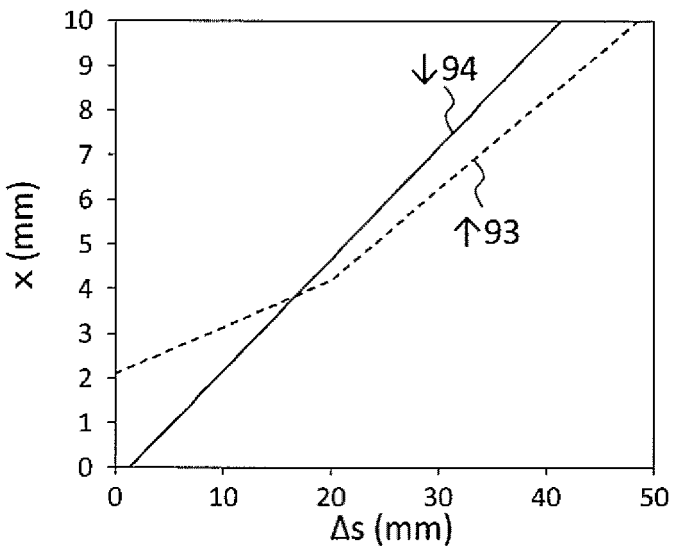
[Fig. 13C]

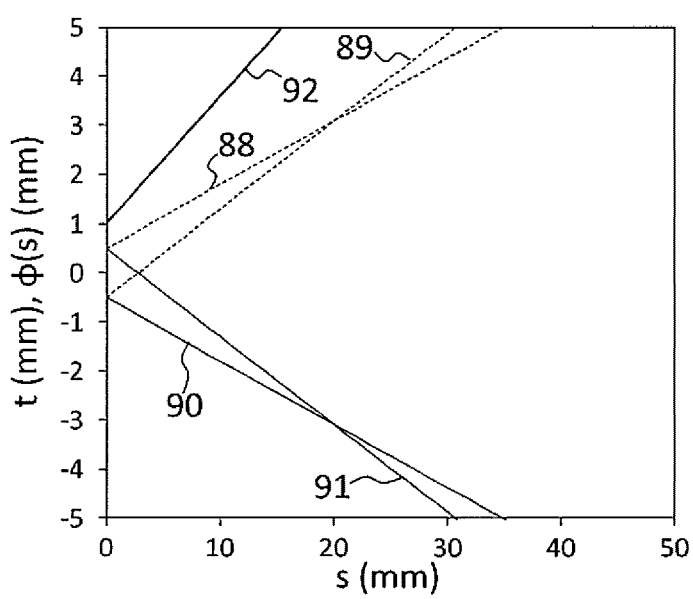
[Fig. 14A]
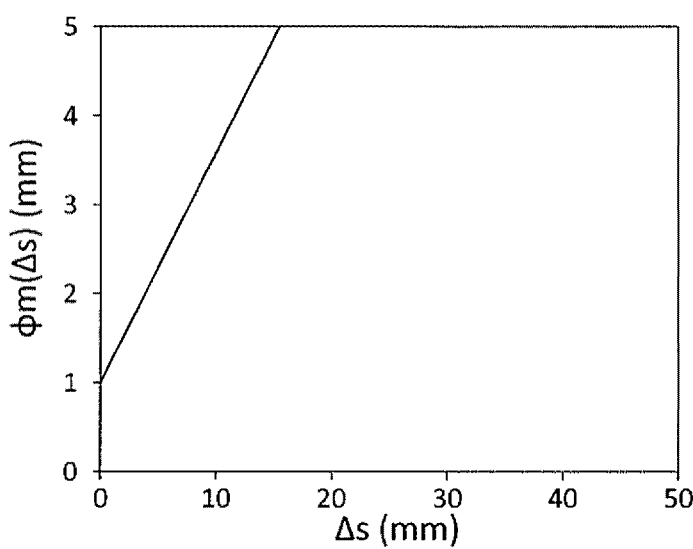
[Fig. 14B]
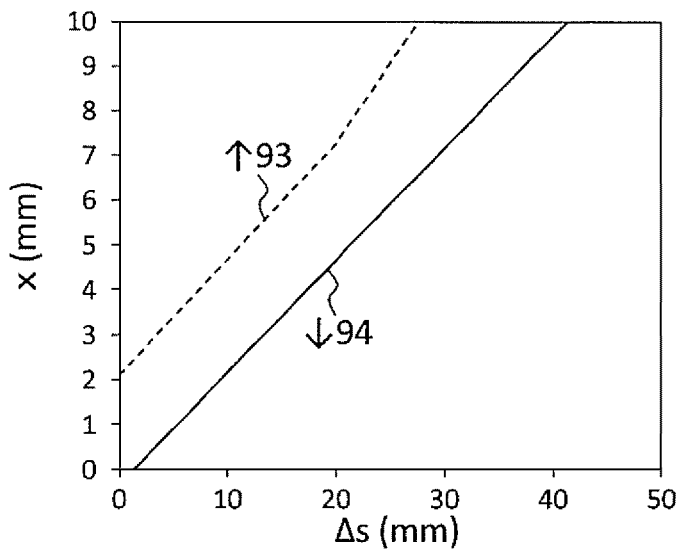
[Fig. 14C]

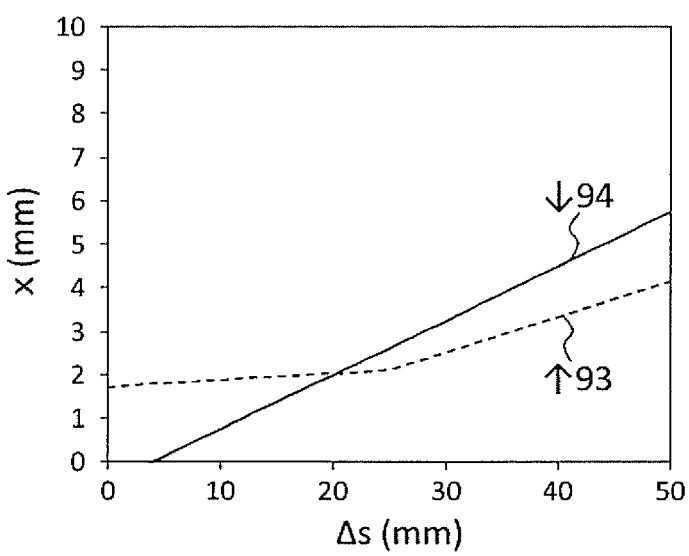
[Fig. 15A]
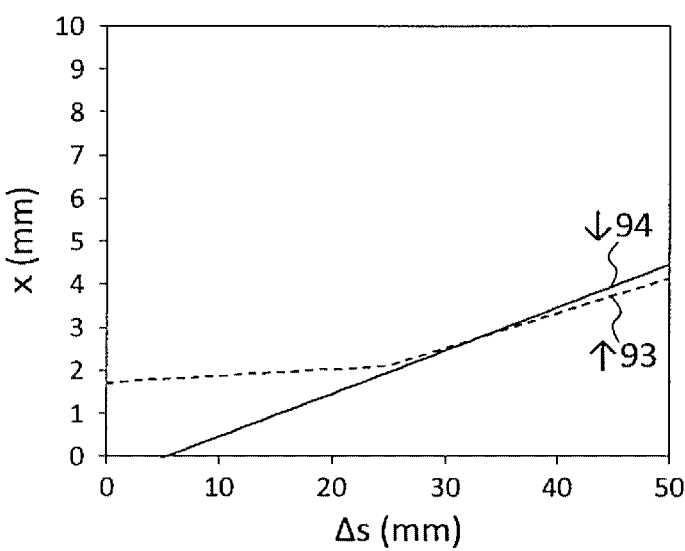
[Fig. 15B]
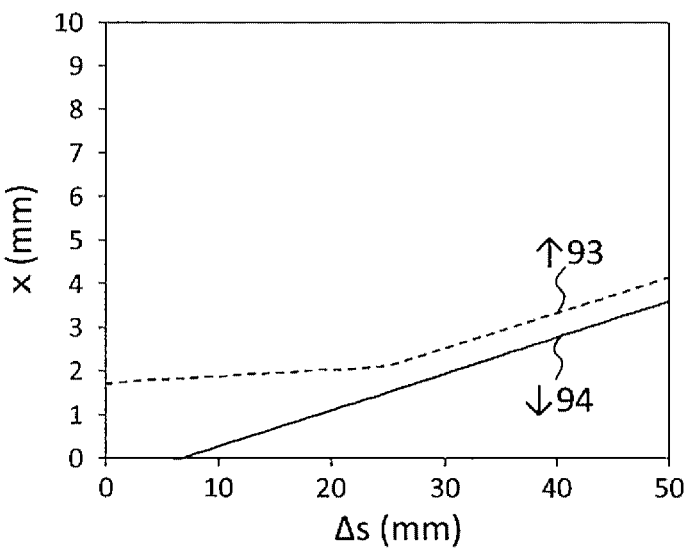
[Fig. 15C]

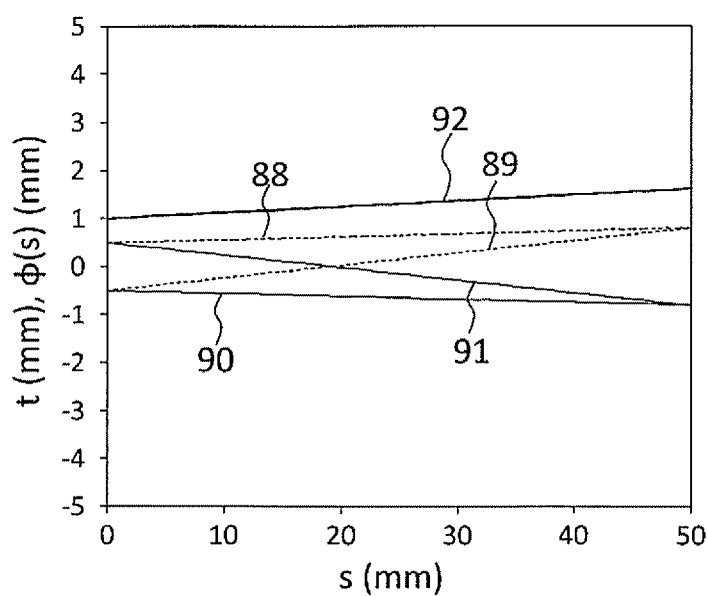
[Fig. 16A]
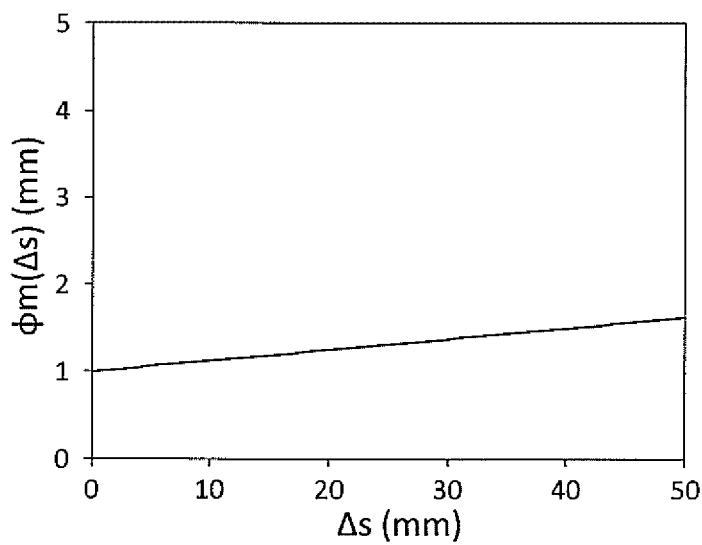
[Fig. 16B]
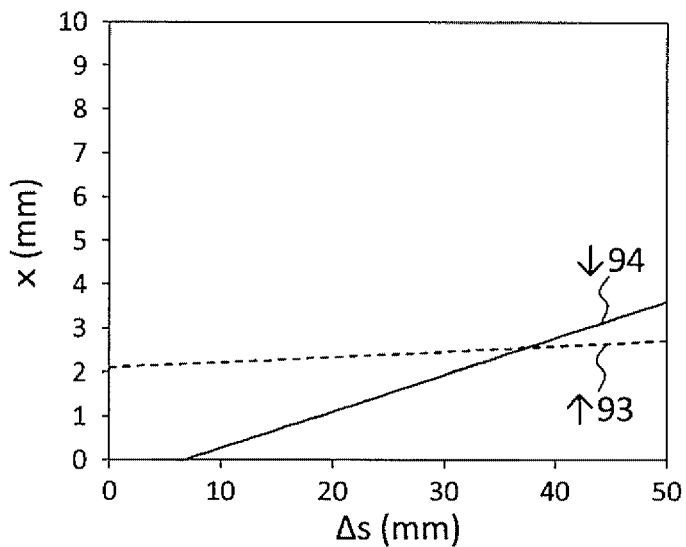
[Fig. 16C]

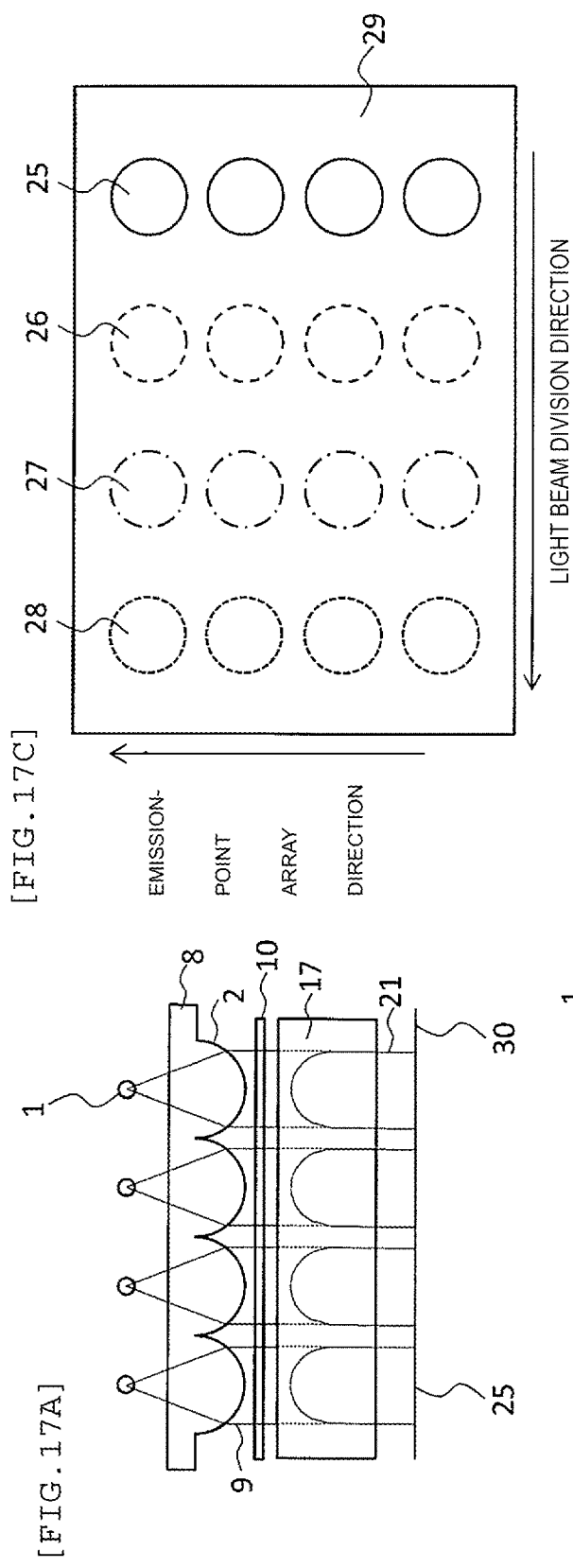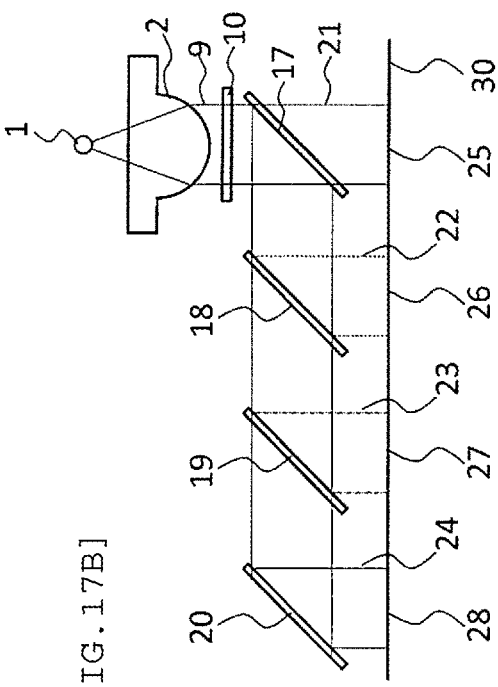

[Fig. 18]
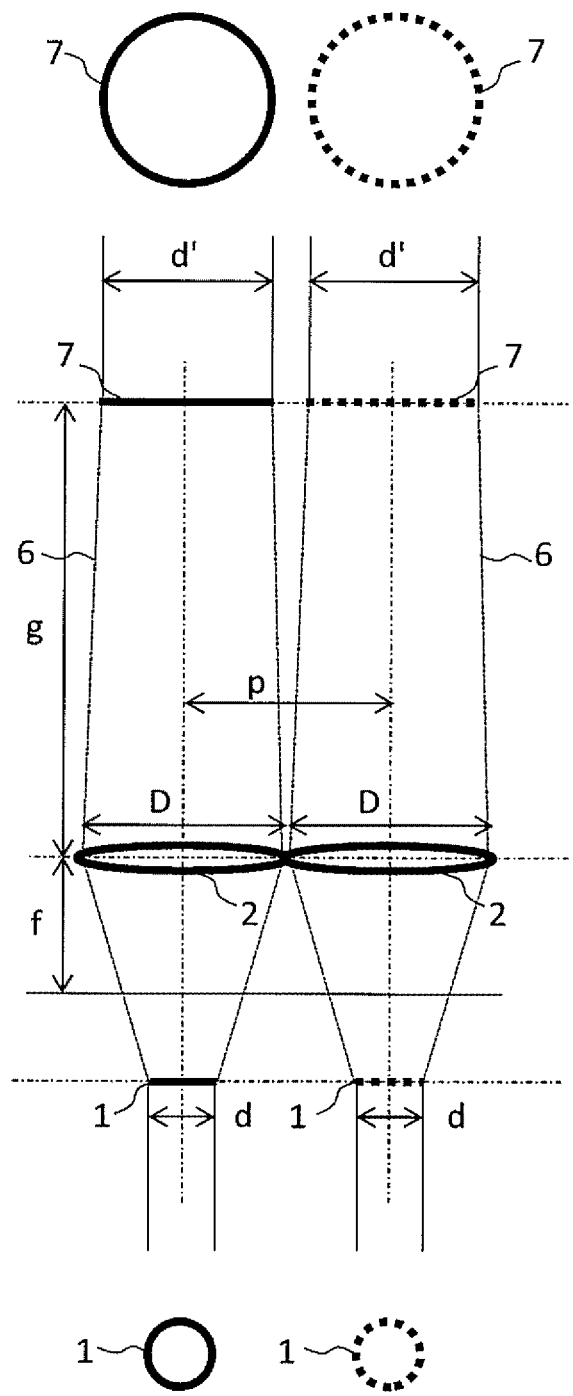

[Fig. 19]
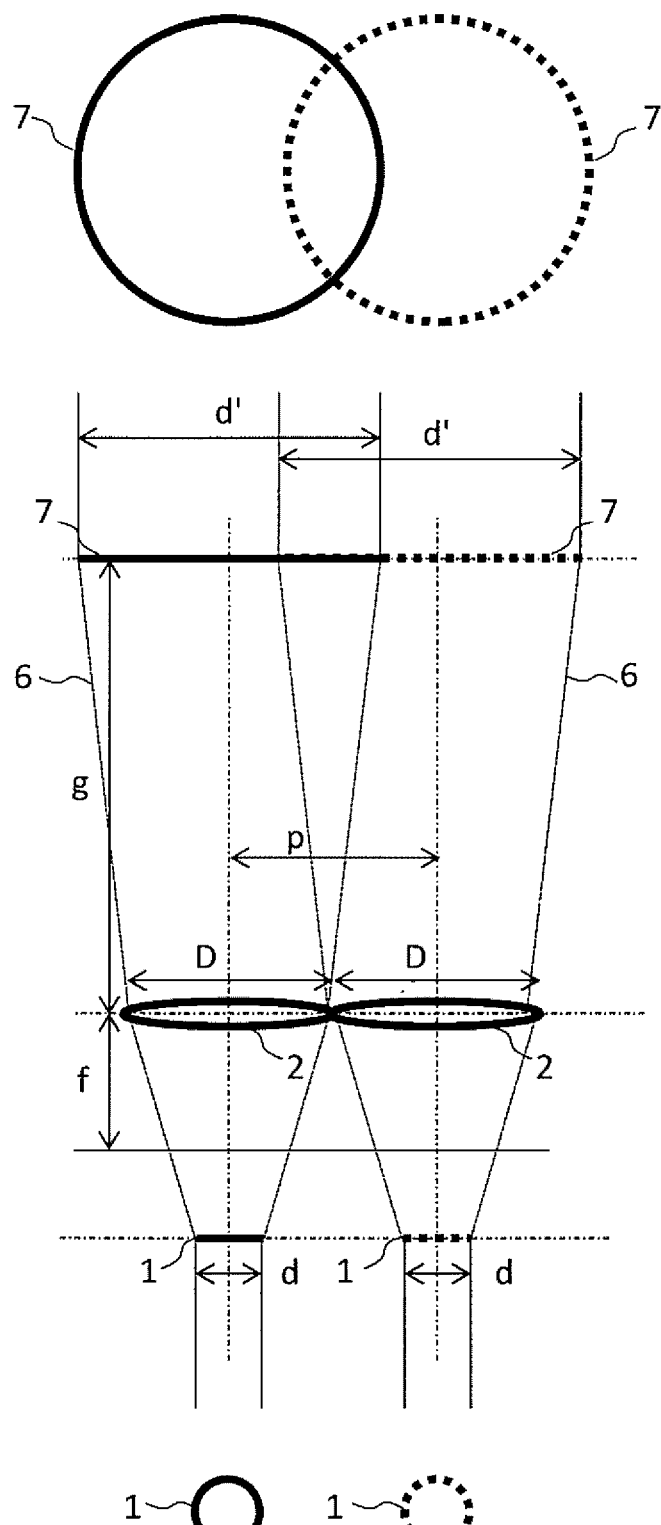

[Fig. 20]
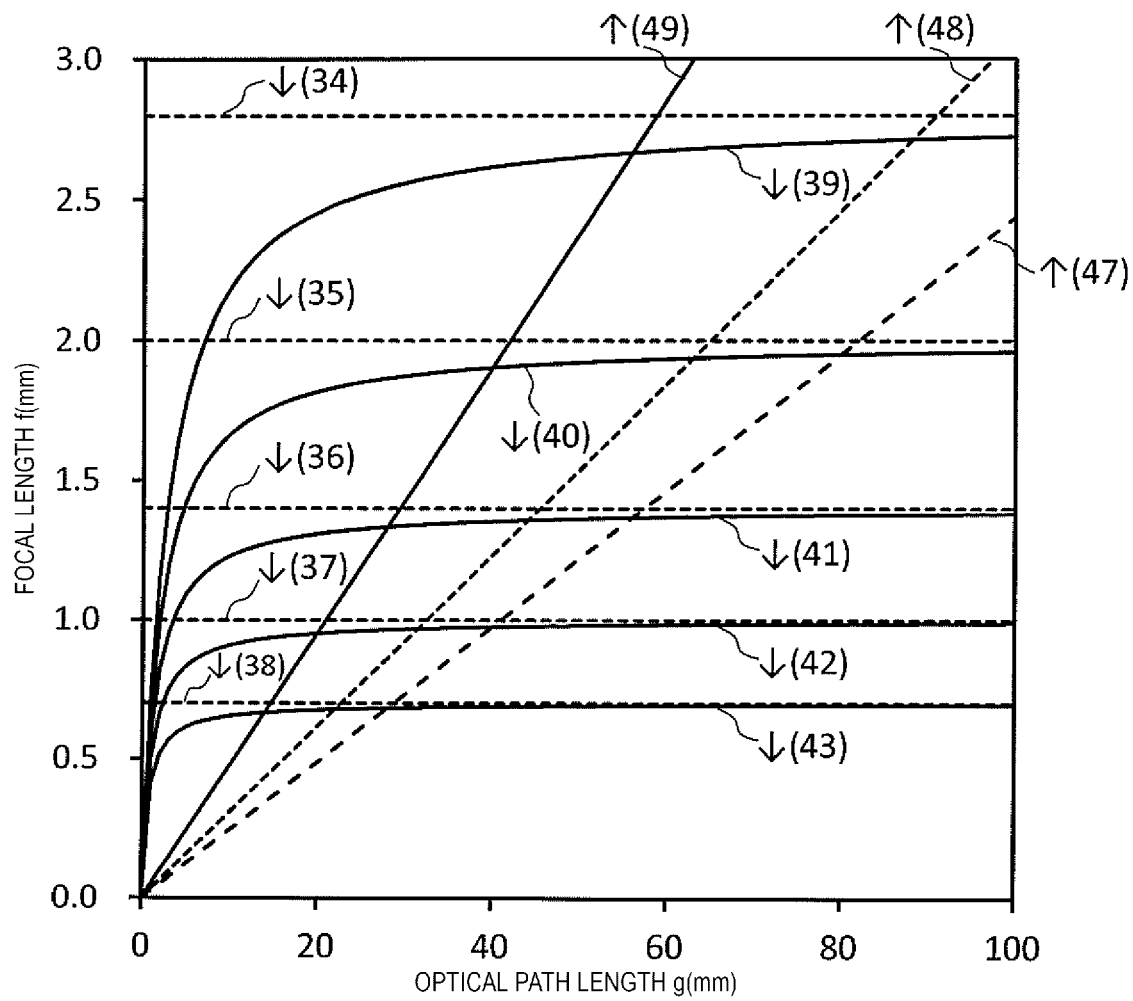

DICHROIC-MIRROR ARRAY

TECHNICAL FIELD

The present invention relates to a spectroscopic apparatus that divides a single light beam or a plurality of light beams into light beams having respectively different wavelengths or an apparatus that combines a plurality of light beams having different wavelengths into a single light beam.

BACKGROUND ART

A dichroic-mirror array is an apparatus in which a plurality of dichroic mirrors having different spectroscopic characteristics (wavelength dependence of transmitted light and reflected light with respect to incident light) are arranged at equal intervals in parallel with each other in the same direction. A light beam incident to the dichroic-mirror array is divided into a plurality of light beams having different wavelength bands by repeating reflection and transmission in order of arrangement in the dichroic mirrors, and is spectroscopically detected by detecting the divided light beams. Alternatively, a plurality of light beams having different wavelength bands incident to the dichroic-mirror array are integrated into a single light beam in which the different wavelength bands are combined by repeating reflection and transmission in the dichroic mirrors.

PTL 1 discloses a spectroscopic apparatus that uses a dichroic-mirror array. A plurality of dichroic mirrors having different spectroscopic characteristics are arranged at equal intervals in parallel with each other in the same direction (the arrangement direction), and an incident light incident to the dichroic-mirror array is divided into a plurality of emitted lights having different wavelength bands by repeating reflection and transmission in order of arrangement in the dichroic mirrors, thereby, being emitted in a direction perpendicular to the arrangement direction. The emitted lights are perpendicularly incident on each sensor of a sensor array in which a plurality of the sensors are arranged in the arrangement direction and are detected. Each dichroic mirror configuring the dichroic-mirror array is composed of a dielectric multilayer film formed inside a transparent material such as glass. Alternatively, each dichroic mirror configuring the dichroic-mirror array has a plate shape and is arranged in the atmosphere.

PTL 2 discloses a spectroscopic apparatus that uses a dichroic-mirror array which is different from that used by the spectroscopic apparatus of PTL 1. A plurality of dichroic mirrors having different spectroscopic characteristics are arranged at equal intervals in parallel with each other in the same direction (the arrangement direction) in the atmosphere. In addition, a total-reflection-mirror array is arranged in the arrangement direction in parallel with each other at equal intervals. The respective total reflection mirrors are arranged such that a light reflected by one of the dichroic mirror is incident on one of the total reflection mirror and a light reflected by the total reflection mirror is incident on the adjacent dichroic mirror. An incident light in the arrangement direction is perpendicularly reflected and then, repeatedly reflected by each dichroic mirror and each total reflection mirror and transmitted through each dichroic mirror, and thereby is divided into a plurality of emitted lights having different wavelength bands and being emitted in a direction perpendicular to the arrangement direction and on a side opposite to the total-reflection-mirror array. The emitted lights are perpendicularly incident on the respective sensors of a sensor array in which a plurality of sensors are arranged in the arrangement direction and are detected. In PTL 1, an incidence angle of the incident light on each dichroic mirror is basically 45°, whereas in PTL 2, an incidence angle can be less than 45°, and thereby, there is a merit that the spectroscopic characteristics of each dichroic mirror can be improved.

PTL 3 discloses a multiplexing apparatus that uses a dichroic-mirror array. A plurality of dichroic mirrors having different spectroscopic characteristics are arranged in parallel with each other at equal intervals in the same direction (the arrangement direction), and a plurality of laser beams of different wavelengths incident to the dichroic-mirror array are repeatedly reflected by and transmitted through each dichroic mirror, and thereby are integrated into a single laser beam having different wavelengths and being emitted in the arrangement direction. Here, the respective dichroic mirrors are arranged in a stepwise manner in a direction perpendicular to the arrangement direction, but there is no disclosure on explanation thereof and the amount thereof.

CITATION LIST

Patent Literature

PTL 1: JP-A-2012-242117
PTL 2: Japanese Patent No. 4109174
PTL 3: US 2002/0154317 A1

SUMMARY OF INVENTION

Technical Problem

In PTL 1 to PTL 3, an incident light is a parallel light or a substantially parallel light. However, an incident light is often not regarded as a parallel light in many cases as a practical problem. In those cases, the incident light is treated as a light beam (not a parallel light beam) and it is necessary to consider how the diameter of the light beam (a width of a cross section perpendicular to an optical axis of the light beam) changes. This is because an aperture width of the dichroic-mirror array representing an upper limit of the diameter of the light beam that can be accepted by the dichroic-mirror array is determined by a structure thereof. For example, if the diameter of the light beam increases with an optical path length, there is a case where the diameter exceeds the aperture width and a part of the light beam is shaded by the structure of the dichroic-mirror array, that is, a case where a part of the light beam is lost and is not detected. Thus, it is desirable for the dichroic-mirror array to have as short an optical path length as possible and to have as large an aperture width as possible. Here, the optical path length of the dichroic-mirror array is defined as an optical path length of the divided light having the longest optical path length among a plurality of the divided lights by the dichroic-mirror array. Alternatively, the optical path length of the dichroic-mirror array is defined as an optical path length of the incident light having the longest optical path length among a plurality of the incident lights integrated by the dichroic-mirror array. In order to shorten the optical path length of the dichroic-mirror array, it is necessary to miniaturize the dichroic-mirror array, that is, to reduce a size of each dichroic mirror and an interval of the dichroic mirrors. Meanwhile, miniaturizing the dichroic-mirror array makes it possible to reduce a size of an apparatus, and thereby, it is also possible to reduce a manufacturing cost. For example, since the size of each dichroic mirror can be reduced, a unit cost of each dichroic mirror can be reduced.

However, if the dichroic-mirror array is miniaturized, a problem that the aperture width is drastically reduced was found by the present inventor. That is, it is found that there was a trade-off relationship between reduction of the optical path length of the dichroic-mirror array and an increase of the aperture width and it was difficult to make those compatible. In the conventional dichroic-mirror array including PTL 1 to PTL 3, the problem is not recognized or taken into consideration. In addition, it was not also studied what type of dichroic-mirror-array structure was suitable to detection of any light beam which was not parallel light strictly, without loss of a part of the light beam.

Solution to Problem

First, the reason why the aperture width was sharply reduced, if a size of the dichroic-mirror array was reduced, was considered. As a result, it turned out that the following two were the cause. One was that a ratio of a thickness of each dichroic mirror to a width of an incidence surface of each dichroic mirror could not be ignored, specifically, the amount of refraction of a light beam inside each dichroic mirror, that is, a ratio of a deviation (deviation in a direction perpendicular to the arrangement direction of the dichroic-mirror array) of an optical axis of the light beam between before and after transmission through each dichroic mirror to a width of each dichroic mirror in a direction perpendicular to the arrangement direction could not be ignored. The other is that a ratio of the thickness of each dichroic mirror to an interval of dichroic mirrors in the arrangement direction could not be ignored, specifically, a ratio of a width of a portion of the light beam shaded by the (n−1)th dichroic mirror to a width of the light beam reflected by the nth dichroic mirror was not ignored. In any case, it corresponds to the fact that the thickness of each dichroic mirror cannot be regarded as zero.

Therefore, in the present invention, a structure of the dichroic-mirror array is optimized so as to avoid or reduce influence of an increase in the ratio of the thickness of each dichroic mirror to the width of each dichroic mirror and the interval of the dichroic mirrors. In one specific aspect, in arrangement of each dichroic mirror, a step difference in a direction perpendicular to the arrangement direction of the dichroic-mirror array is provided, and the amount of the step difference is optimized according to the width and the thickness of each dichroic mirror. In addition, in another aspect, in each dichroic mirror arrangement, the interval of the dichroic mirrors is optimized according to the width and the thickness of each dichroic mirror. That is, the step difference and the interval of the dichroic-mirror array satisfy a predetermined relationship with the width and the thickness of each dichroic mirror, and thereby, a reduction of an optical path length and an increase of an aperture width are both achieved and the dichroic-mirror array is miniaturized while the above-described influence is avoided or reduced.

Advantageous Effects of Invention

According to the present invention, while a dichroic-mirror array is miniaturized, a reduction of an optical path length and an increase of an aperture width can be both achieved. Thus, it is possible to reduce a size of an apparatus and to reduce its manufacturing cost, and it is possible to perform spectroscopic detection of various types of light beams and integration of various types of light beams.

Problems, configurations, and effects other than those described above will become apparent by description of the following embodiments.

BRIEF DESCRIPTION OF DRAWINGS

FIG. 1 is a diagram illustrating a configuration of a dichroic-mirror array in a best mode for reducing an optical path length and enlarging an aperture width.

FIG. 2 is a diagram illustrating a relationship between a thickness $\beta$ of each dichroic mirror and an interval x of a dichroic-mirror array, where the optical path length of the dichroic-mirror array is smaller than or equal to $L_{max}$ and the aperture width is larger than or equal to $W_{min}$.

FIG. 3 shows calculation results illustrating an example of a dichroic-mirror array that divides a parallel light beam with a maximum width incident in parallel with the dichroic-mirror array into a plurality of parallel light beams in a vertical direction to the dichroic-mirror array.

FIG. 4 shows calculation results illustrating an example of a dichroic-mirror array that divides a parallel light beam with a maximum width incident in a vertical direction to the dichroic-mirror array into a plurality of parallel light beams in the same direction.

FIG. 5 shows calculation results illustrating an example of a miniaturized dichroic-mirror array that divides a parallel light beam with a maximum width incident in a vertical direction to the dichroic-mirror array into a plurality of parallel light beams in the same direction.

FIG. 6 shows calculation results illustrating an example of a miniaturized and stepwise dichroic-mirror array that divides a parallel light beam with a maximum width incident in a vertical direction to the dichroic-mirror array into a plurality of parallel light beams in the same direction.

FIG. 7 is a diagram illustrating relationships between the interval x and the aperture width W, and the interval x and an optical path length change ΔL, of the dichroic-mirror array.

FIGS. 8A and 8B are diagrams illustrating a relationships between step differences y and z and the aperture width W, of the dichroic-mirror array.

FIG. 9 shows calculation results illustrating an example of a dichroic-mirror array in which the dichroic mirrors are tilted at more than 45° with respect to the dichroic-mirror-array direction, that divides a parallel light beams with maximum width incident in a vertical direction to the dichroic-mirror array into a plurality of parallel light beams in the same direction.

FIG. 10 is a diagram illustrating a relationship between an angle $\theta_0$ of the dichroic mirrors with respect to the dichroic-mirror-array direction and the aperture width W, of the dichroic-mirror array.

FIGS. 11A and 11B are diagrams for defining a relationship between an optical path length and a maximum diameter of a light beam obtained by condensing light emitted from a light-emission point.

FIGS. 12A to 12C are diagrams illustrating an example of a relationship between the optical path length and the maximum diameter of a light beam, and a dichroic-mirror array that is available.

FIGS. 13A to 13C are diagrams illustrating an example of the relationship between the optical path length and the maximum diameter of a light beam, and a dichroic-mirror array that is available.

FIGS. 14A to 14C are diagrams illustrating an example of the relationship between the optical path length and the maximum diameter of the light beam, and the dichroic array that is available.

FIGS. 15A to 15C are diagrams illustrating a relationship between the number of divisions of a light beam and a dichroic-mirror array that is available.

FIGS. 16A to 16C are diagrams illustrating an example of the relationship between the optical path length and the maximum diameter of a light beam, and a dichroic array that is available.

FIGS. 17A to 17C are schematic diagrams of a light emission detection apparatus that individually condenses lights emitted from a light-emission-point array using a condensing-lens array, divides each light beam into light beams with different wavelength bands in parallel using the dichroic-mirror array, and detects the light beams incident on a sensor in parallel.

FIG. 18 is a schematic diagram of a configuration in which lights emitted from two adjacent light-emission points are individually condensed by condensing lenses to obtain separated light beams.

FIG. 19 is a schematic diagram of a configuration in which lights emitted from two adjacent light-emission points are individually condensed by condensing lenses to obtain mixed light beams.

FIG. 20 is a diagram illustrating a relationship between the optical path length g between the condensing lens and the sensor, and a focal length f of the condensing lens satisfying a conditions of high sensitivity and low crosstalk.

DESCRIPTION OF EMBODIMENTS

FIG. 1 is a schematic diagram illustrating an optimal arrangement that achieves both reduction of an optical path length and enlargement of an aperture width of a dichroic-mirror array, in a generalized manner, in a case where a ratio of a thickness of each dichroic mirror to a width of each dichroic mirror and an interval of the dichroic mirrors is relatively large. In PTLs 1 and 2, the incident light is introduced into the dichroic-mirror array from the direction parallel to the arrangement direction of the dichroic-mirror array, but an example in which an incident light is introduced into a dichroic-mirror array from a vertical direction to an arrangement direction of the dichroic-mirror array so as to further downsize an apparatus will be hereinafter described.

As illustrated in FIG. 1, an arrangement axis in a first direction and an emission axis in a second direction perpendicular to the first direction are defined. N dichroic mirrors M(1), M(2), ..., M(N) with different spectroscopic characteristics are arranged in the air in a numerical order along the arrangement axis at an interval x. FIG. 1 is a cross-sectional diagram of the dichroic-mirror array by a plane spanned by the arrangement axis and the emission axis. Each normal vector (not explicitly illustrated in FIG. 1) of each dichroic mirror is configured by a sum of a positive component in the arrangement axis direction and a negative component in the emission axis direction (that is, each normal vector is toward an upper left in FIG. 1), and forms an angle $\theta_0$ ($0° \leq \theta_0 \leq 90°$) with an opposite direction of the emission axis. That is, each normal vector is parallel to each other. Each dichroic mirror is fabricated by an optical film being formed at least on a front surface of a transparent substrate with a refractive index $n_0$. FIG. 1 illustrates a case where N=4 and $\theta_0$=45°. The dichroic mirror mirrors M(1) and M(N) may be replaced by total reflection mirrors. In the present embodiment, a total reflection mirror is also expressed as a dichroic mirror. As illustrated in FIG. 1, a width of each dichroic mirror is referred to as α and a thickness of each dichroic mirror is referred to as β. In addition, a depth of each dichroic mirror in a direction perpendicular to a paper surface of FIG. 1 is referred to as γ. Here, the width a of each dichroic mirror is defined as a width that is parallel to a plane spanned by the arrangement axis and the emission axis and is perpendicular to a normal vector. The thickness β of each dichroic mirror is defined as a width which is parallel to a normal vector. In addition, the depth γ of each dichroic mirror is defined as a width which is perpendicular to the plane spanned by the arrangement axis and the emission axis and is perpendicular to a normal vector.

As illustrated in FIG. 1, a lower end of the dichroic mirror M(2) (an end of M(2) in the positive direction of the emission axis) is disposed to be shifted upward (a negative direction of the emission axis) by y with respect to a lower end of the dichroic mirror M(1) (an end of M(1) in the positive direction of the emission axis). In addition, a lower end of the dichroic mirror M(3) (an end of M(3) in the positive direction of the emission axis) is disposed to be shifted upward (a negative direction of the emission axis) by z with respect to the lower end of M(2). In the same manner, with $3 \leq n \leq N$, a lower end of the dichroic mirror M(n) is disposed to be shifted upward by z with respect to a lower end of the dichroic mirror M(n−1). Thus, although it is described that the respective dichroic mirrors are arranged along the arrangement axis in the above description, strictly speaking, the arrangement direction is slightly tilted from the arrangement axis. However, since y and z are often smaller than x and the tilt is small enough, in the present embodiment, it is described that each dichroic mirror is arranged along the arrangement axis as described above.

Meanwhile, as illustrated in FIG. 1, an ideally parallel light beam 70 is incident on the dichroic mirror M(1) along the emission axis and is divided into a light beam to be reflected along the arrangement axis and a light beam F(1) to be transmitted along the emission axis. The light beam to be reflected by M(1) is incident on the dichroic mirror M(2) along the arrangement axis and is divided into a light beam F(2) to be reflected along the emission axis and a light beam to be transmitted along the arrangement axis. The light beam to be transmitted through M(2) is incident on the dichroic mirror M(3) along the arrangement axis and is divided into a light beam F(3) to be reflected along the emission axis and a light beam to be transmitted along the arrangement axis. In the same manner, assuming with $3 \leq n \leq N$, the light beam to be transmitted through the dichroic mirror M(n−1) is incident on the dichroic mirror M(n) along the arrangement axis and is divided into a light beam F(n) to be reflected along the emission axis and a light beam to be transmitted along the arrangement axis. In FIG. 1, by using the total reflection mirror M(n) as the dichroic mirror M(n), there is no light beam to be transmitted through M(n).

A right end of the light beam 70 (end in the negative direction of the arrangement axis) is denoted by a dashed line as a light-beam right end 66, while a left end of the light beam (end in the positive direction of the arrangement axis) is denoted by an alternate long and short dash line as a light-beam left end 67. Both lines are extended by tracking to the right ends and the left ends of the light beam F (1), F (2), F (3), ..., and the light beam F (N). In FIG. 1, widths of the light beams 70, F(1), F 2), ..., F(N) are set to be equal and maximized. The width is called an aperture width of the dichroic-mirror array, and is referred to as W. In addition, the optical path length of the dichroic-mirror array is defined as an optical path length of the longest optical path within a region surrounded by an upper end, a right end, a lower end, and a left end of the dichroic-mirror array. In FIG. 1, the optical path length of the optical path from the light beam 70 to the light beam F(N), between the upper end of the dichroic-mirror array, that is, a point having the same emission axis coordinate as the upper end (end in the negative direction of the emission axis) of the dichroic mirror M(N) on the optical axis of the light beam 70, and the lower end of the dichroic-mirror array, that is, a point having the same emission axis coordinate as the lower end (end in the positive direction of the emission axis) of the dichroic mirror M(1) on the optical axis of the light beam F(N), is called an optical path length of the dichroic-mirror array, and is referred to as L.

FIG. 1 illustrates an arrangement of the best mode in which W is maximized and L is minimized with respect to the given $\alpha$, $\beta$, $n_0$, and $\theta_0$. The following two are conditions for the best mode. First, the light-beam right end 66 passes through or passes by the corners 69, which are denoted by triangles, of the left ends (ends in the arrangement axis direction) of the dichroic mirrors M(1), M(2), ..., and M(N−1). Second, the light-beam left end 67 passes through or passes by a corner 68, which is denoted by a circle, of the lower end (end in the emission axis direction) of the dichroic mirror M(1), and passes through or passes by the corners 69 of the left ends (end in the arrangement axis direction) of the dichroic mirrors M(2), ..., and M(N−1). The following relational equations are derived from a geometrical relationship of FIG. 1 based on the above described conditions.

First, an incidence angle of the light beam 70 on an incidence surface of the dichroic mirror M(1) is $\theta_0$, and a refraction angle $\theta_1$ of the light beam 70 on the incidence surface is obtained by Equation (1).

$\theta_1 = \sin^{-1}(1/n_0 \times \sin \theta_0)$ [Equation 1]

In addition, an incidence angle of the light beam on each incidence surface of the dichroic mirrors M(2) to M(N) is 90°−$\theta_0$, and a refraction angle $\theta_2$ of the light beam on each incidence surface is obtained by Equation (2).

$\theta_2 = \sin^{-1}(1/n_0 \times \sin(90° - \theta_0))$ [Equation 2]

A relation between the interval x and the width a of each of the dichroic mirrors M(1) to M(N) is obtained by Equation (3) in the best mode.

$x = x_0 = \cos \theta_0 \times \alpha + \sin \theta_0 \times \beta$ [Equation 3]

Meanwhile, the aperture width W is obtained by Equation (4) in the best mode.

$W = W_0 = a_W \times \alpha + b_W \times \beta$ [Equation 4]

Here, Equation (5) and Equation (6) are defined.

$a_W = \cos \theta_0$ [Equation 5]

$b_W = -\cos \theta_0 \times \tan \theta_1$ [Equation 6]

Furthermore, in the best mode, the optical path length L is obtained by Equation (7).

$L = L_0 = a_L \times \alpha + b_L \times \beta$ [Equation 7]

Here, Equation (8) and Equation (9) are defined.

$a_L = (N-1) \times \cos \theta_0 + \sin \theta_0$ [Equation 8]

$b_L = (N-2)/\cos \theta_0 \times (2 \times \sin(90° - \theta_0 - \theta_2) + 1 - \sin(\theta_0 + \theta_2)) + (N-2) \times \sin \theta_0 + 2 \times \cos \theta_0$ [Equation 9]

On the other hand, the step differences y and z of each of the dichroic mirrors M(1) to M(N) are as follows in the best mode.

$y = y_0 = \cos \theta_0 \times \beta$ [Equation 10]

$z = z_0 = \sin(90° - \theta_0 - \theta_2)/\cos \theta_2 \times \beta$ [Equation 11]

As described above, $x_0$, $W_0$, $L_0$, $y_0$, and $z_0$ are all associated with $\alpha$ and $\beta$. The above $\alpha$, $\beta$, $n_0$, $\theta_0$, x, and z are basically equal for each dichroic mirror but are not necessarily equal. In such a case, $\alpha$, $\beta$, $n_0$, $\theta_0$, x, and z are average values for a plurality of dichroic mirrors.

By solving the above, it is possible to derive $\alpha$, $\beta$, and x for obtaining a minimum value $W_{min}$ or a target aperture width. Equation 12 (an equal sign is used only in the best mode) is derived from $W_0 \geq W_{min}$ and Equation (4).

$\alpha \geq -b_W/a_W \times \beta + 1/a_W \times W_{min}$ [Equation 12]

Equation 13 is derived from Equation (3).

$x \geq (\sin \theta_0 - b_W/a_W \times \cos \theta_0) \times \beta + a_W \times \cos \theta_0 \times W_{min}$ [Equation 13]

Here, the equal sign is used only in the best mode.

In the same manner, $\alpha$, $\beta$, and x for obtaining the maximum value $L_{max}$ or a target optical path length can be derived. Equation (14) (an equal sign is used only in the best mode) is derived from $L_0 \leq L_{max}$ and Equation (7).

$\alpha \leq -b/a_L \times \beta + 1/a_L \times L_{max}$ [Equation 14]

Equation (15) is derived from Equation (3).

$x \leq (\sin \theta_0 - b_L/a_L \times \cos \theta_0) \times \beta + 1/a_L \times \cos \theta_0 \times L_{max}$ [Equation 15]

Here, the equal sign is used only in the best mode.

FIG. 2 illustrates a range satisfying Equation (13) and Equation (15) with the horizontal axis $\beta$ and a vertical axis x in a case where N=4, $n_0$=1.46, $\theta_0$=45° as an example. Parameters are set as $W_{min}$=0.5 mm, 1 mm, 2 mm, 3 mm, and 4 mm, and $L_{max}$=5 mm, 10 mm, 20 mm, 30 mm, and 40 mm, ↑ indicates a range above a straight line, and ↓ indicates a range below the straight line. It can be seen that, for example, in order to achieve $W_{min}$=0.5 mm and $L_{max}$=20 mm, $\beta$ and x in the range above the straight line of ↑$W_{min}$=0.5 and below the straight line of ↓$L_{max}$=20 may be selected in FIG. 2.

The above description is related to a case where the light beam 70 is incident to the dichroic-mirror array along the emission axis as illustrated in FIG. 1, but in a case where the light beam 70 is incident to the dichroic-mirror array along the arrangement axis as disclosed in PTL 1 and PTL 2, only the following modification may be made in the above description. In 2≤n≤N, the lower end of the dichroic mirror M(n) (end of M(n) in the positive direction of the emission axis) is disposed to be shifted upward (in the negative direction of the emission axis) by the z described above with respect to the lower end of the dichroic mirror M(n−1) (end of M(n−1) in the positive direction of the emission axis). That is, the y described above is canceled and may be replaced with the z described above.

Hereinafter, Embodiments of the present invention will be described.

Embodiment 1

FIG. 3 illustrates an example of a dichroic-mirror array that divides a light beam incident in parallel to the dichroic-mirror array into a plurality of light beams in a vertical direction, and illustrating calculation results of a parallel and dividable light beam having a maximum width. FIG. 3 is a schematic cross-sectional diagram of the dichroic-mirror array with a plane spanned by the arrangement axis and the emission axis. The light beam is incident to the dichroic-mirror array along the arrangement axis direction, is divided into a plurality of light beams with different wavelength bands along the emission axis direction by the dichroic-mirror array, and then the plurality of light beams are incident on the two-dimensional sensor 30 in parallel.

Each of the dichroic mirrors 17, 18, 19, and 20 has a width of $\alpha=5$ mm, a thickness of $\beta=1$ mm, and a depth of $\gamma=5$ mm in a direction perpendicular to a paper surface of FIG. 3. Each dichroic mirror is composed of a quartz substrate (refractive index $n_0=1.46$) on the lower-right front surface (the positive direction of the emission axis) of which a multilayer film or a single layer film is formed. Here, the light beam to be transmitted through the dichroic mirror 20 is not displayed. An antireflection film for reducing a reflection loss is also formed on the upper-left front surface (the positive direction of the arrangement axis) of each of the dichroic mirrors 17, 18, and 19. Each dichroic mirror is arranged in the air such that an angle between each normal vector and the negative direction of the emission axis is $\theta_0=45°$ and an interval of the dichroic mirrors in the arrangement axis direction is x=5 mm. The upper ends (the ends in the negative direction of the emission axis) and the lower ends (the ends in the positive direction of the emission axis) of the dichroic mirrors are made to be on the same planes, respectively. That is, they have the same coordinates of the emission axis, respectively.

FIG. 3 illustrates the calculation results of the light beams when the width 63 of the light beams is constant and maximum in the above-described dichroic-mirror array. The emission axis coordinate of the optical axis of the light beam incident to the dichroic-mirror array is adjusted such that the width 63 is maximized. Each light beam is configured with 11 parallel, equally-spaced light beam elements 65 with an infinitely small width, and the respective optical paths are calculated by light ray tracing according to a law of reflection and a law of refraction. That is, the width 63 of each light beam indicates the aperture width W of the dichroic-mirror array. In addition, the optical path length L of the dichroic-mirror array is calculated as the optical path length of the optical path 64, from a point of the same arrangement axis coordinate as the right end (the end in the negative direction of the arrangement axis) of the dichroic mirror 17, to a point of the same emission axis coordinate as the lower end (the end in the positive direction of the emission axis) of the dichroic mirror 20, on the optical element 65 at the center of each light beam. As a result, the aperture width 63 is calculated as W=2.1 mm and the optical path length 64 is calculated as L=19 mm.

FIG. 4 is a diagram in which a travel direction of the light beam incident to the dichroic-mirror array in FIG. 3 is changed from the arrangement axis direction to the emission axis direction. Other conditions such as the configuration of the dichroic-mirror array are the same as in FIG. 3. The reason for doing so is that a distance between a light source (not illustrated) providing the light beam and the dichroic-mirror array can be closer than in a case of FIG. 3 and an apparatus can be further miniaturized. As a result, the aperture width 63 is calculated as W=1.7 mm, and the optical path length 64 is calculated as L=18 mm, and as compared with FIG. 3, L is hardly changed, but W is slightly reduced.

FIG. 5 is a diagram illustrating an example in which a size of the dichroic-mirror array is further reduced and thereby the optical path length is shortened, as compared with FIG. 4. Each of the dichroic mirrors 17, 18, 19, and 20 has a width of $\alpha=2.5$ mm (half of the width in FIG. 4) and a thickness of $\beta=1$ mm, and a depth of $\gamma=5$ mm in the direction perpendicular to the paper surface of FIG. 5. Each dichroic mirror is arranged such that an interval of the dichroic mirrors in the arrangement axis direction is x=2.5 mm (half of the interval in FIG. 4). The other conditions are the same as in FIG. 4. As a result, the aperture width 63 is calculated as W=0.03 mm, the optical path length 64 is calculated as L=9 mm, and as compared with FIG. 4, L is reduced by half as expected, while W is greatly reduced by nearly two orders of magnitude.

That is, FIG. 5 illustrates that, if the optical path length is reduced, the aperture width is further reduced, and therefore reduction of the optical path length and enlargement of the aperture width cannot be both achieved. This is because, as can be seen from FIG. 5, when the light beam passes through each dichroic mirror, an optical axis of the light beam moves in the negative direction of the emission axis due to refraction of the light beam inside each dichroic mirror and the movement distance thereof is significant as compared with the width of each dichroic mirror in the direction of the emission axis. For example, in FIG. 5, if the light beam incident to the dichroic-mirror array shifts slightly in the negative direction of the arrangement axis, the optical path of the light beam element thereof is shifted in the negative direction of the emission axis from the corner of the right end of the dichroic mirror 20, and thus, it is impossible to provide the light beam reflected by the dichroic mirror 20. In the same manner, if the light beam incident to the dichroic-mirror array is shifted slightly in the positive direction of the arrangement axis, the optical path of the light beam element thereof is shifted in the positive direction of the arrangement axis from the corner of the lower end of the dichroic mirror 17, and thus, it is impossible to provide the light beam transmitted through the dichroic mirror 17. It should be noted that, regardless of the fact that the same amount of the above-described movement distance is generated in FIG. 4, because it is smaller than the width of each dichroic mirror in the direction of the emission axis in FIG. 4, reduction of W is not serious in FIG. 4. That is, a ratio of $\beta$ to $\alpha$ or x increases, and thereby, the reduction of W becomes serious.

Accordingly, as illustrated in FIG. 6, stepwise arrangement of each dichroic mirror in the direction of the emission axis is performed. Specifically, the lower end (the end in the positive direction of the emission axis) of the dichroic mirror 18 is shifted upward (in the negative direction of the emission axis) by y=0.7 mm as compared with the lower end (the end in the positive direction of the emission axis) of the dichroic mirror 17. Subsequently, the lower end of the dichroic mirror 19 is shifted upward by z=0.3 mm as compared with the lower end of the dichroic mirror 18. The other conditions are the same as in FIG. 5. As a result, it is found that the aperture width 63 can be greatly expanded from W=0.03 mm in FIG. 5 to W=1.3 mm as illustrated in FIG. 6. Meanwhile, the optical path length 64 is calculated as L=11 mm slightly increased as compared with FIG. 5. Thus, FIG. 6 illustrates a condition under which both reduction of the optical path length and expansion of the aperture width can be achieved.

Next, the configuration of the dichroic-mirror array illustrated in FIG. 6 will be discussed in detail. Since conditions in FIG. 6 are $n_0=1.46$, $\theta_0=45°$, $\alpha=2.5$ mm, and $\beta=1$ mm, $\theta_1=29°$ from Equation (1) and $\theta_2=29°$ from Equation (2). In the best mode, $x_0=2.5$ mm from Equation (3), $y_0=0.7$ mm from Equation (10), and $z_0=0.3$ mm from Equation (11). That is, FIG. 6 illustrates the configuration of the dichroic-mirror array in the best mode. Actually, it is calculated that $a_W=0.7$ from Equation (5), $b_W=-0.4$ from Equation (6) and $W_0=1.4$ mm from Equation (4). Then the value of $W_0$ almost coincide with the above-described W=1.3 mm obtained by light-ray tracing. In addition, $a_L=2.8$ is calculated from Equation (8), $b_L=4.2$ is calculated from Equation (9), and $L_0=11$ mm is calculated from Equation (7). Then the value of $L_0$ coincide with the above-described L=11 mm obtained by light-ray tracing.

Here, the interval x between the dichroic mirrors will be discussed in detail. As described above, in the best mode, it is optimal to have $x_0$ of the Equation (3). In the following, it will be discussed in detail how much deviation from the value in the best mode is acceptable to obtain the advantageous effect.

A solid line illustrated in FIG. 7 denotes a calculated result of a relationship between the interval x and the aperture width W obtained by light-lay tracing in the dichroic mirrors 17 and 18 in FIG. 6. In general, as the total number of dichroic mirrors increases, there is a possibility that the aperture width becomes totally smaller than the above result. However, in this discussion, the case of two dichroic mirrors is evaluated as a reference. The condition of $x=x_0=2.5$ mm calculated by Equation (3) when $\theta_0=45°$, $\alpha=2.5$ mm, and $\beta=1$ mm as illustrated in FIG. 6, gives the maximum aperture width of W=1.3 mm as illustrated in FIG. 7. When $x<x_0$, W decreases in proportion to $|x-x_0|$, and W=0 mm at x=1.6 mm. In contrast to this, when $x>x_0$, W is constant as W=1.3 mm.

Meanwhile, a dashed line illustrated in FIG. 7 denotes a relationship between the interval x and an optical path length change $\Delta L$ (amount of change of the optical path length L) in FIG. 6. Here, when $x=x_0=2.5$ mm, $\Delta L$ is set to zero, and $\Delta L$ (=0 mm) and W (=1.3 mm) are displayed so as to be the same height in FIG. 7. In addition, scales of a vertical axis (left side) for W and a vertical axis (right side) for $\Delta L$ are equal, and the vertical axis for $\Delta L$ is inverted vertically. Generally, as the total number of dichroic mirrors increases, there is a possibility that $\Delta L$ is larger than the above-described results, but here, the case of two dichroic mirrors is evaluated as a reference. $\Delta L$ naturally increased in proportion to x.

From FIG. 7, an increase rate of W with respect to x when 1.6 mm≤x≤2.5 mm, and an increase rate of $\Delta L$ with respect to x when 2.5 mm≤x are both nearly 1 (slope of nearly 1), and equal to each other. In other words, it is found that performance deteriorates in proportion to $|x-x_0|$ in both cases. In contrast to this, in the related art, $\beta$ is not considered, that is, $\beta$ can be regarded as 0 mm, when the interval x in the case of equivalent arrangement (in the best mode) is x=1.8 mm from Equation (3). The value of x=1.8 mm is obtained at W=0.4 mm in FIG. 7. From the above, it is found that 1.8 mm×3.2 mm may be set so as to obtain performance equal to or higher than the performance of the related art. Generally, in FIG. 1, it is assumed that, with 2≤n≤N, the arrangement interval x between the dichroic mirrors M(n) and M(n−1) may be set according to Equation (16).

$$\cos \theta_0 \times \alpha \times \cos \theta_0 \times \alpha + 2 \times \sin \theta_0 \times \beta \quad \text{[Equation 16]}$$

This allows the aperture width W to be increased and the optical path length L to be reduced.

Subsequently, the step differences y and z between the dichroic mirrors M(1) to M(N) will be discussed in detail. As described above, in the best mode, it is optimal to have $y_0$ in Equation (10) and $z_0$ in Equation (11). In the following, it will be discussed in detail how much deviations from these values in the best mode is acceptable to obtain the advantageous effect of the stepwise arrangement. FIG. 8 (a) illustrates a calculation result of a relationship between the step difference y and the aperture width W obtained by the dichroic mirrors 17 and 18 in FIG. 6. Generally, as the total number of dichroic mirrors increases, there is a possibility that the aperture width is totally reduced to less than the above result. However, in this discussion, the case of two dichroic mirrors is evaluated as a reference. The condition of $y=y_0=0.7$ mm calculated by Equation (10) when $\theta_0=45°$ and $\beta=1$ mm as illustrated in FIG. 6, gives the maximum aperture width of W=1.3 mm as illustrated in FIG. 8(a). In addition, W decreases in proportion to $|y-y_0|$, and W=0.6 mm at y=0 mm and 1.4 mm, and W=0 mm at y=−0.7 mm and 2.1 mm. Here, minus y indicates the step difference is in a direction opposite to that in FIG. 6, that is, a case where the dichroic mirror 18 is shifted in the direction of the emission axis with respect to the dichroic mirror 17. Thus, it is found that an effect of the step difference is obtained by setting 0 mm≤y≤1.4 mm.

In the same manner, FIG. 8 (b) illustrates a calculation result of a relationship between the step difference z and the aperture width W obtained by the dichroic mirrors 18 and 19 in FIG. 6. The condition of $z=z_0=0.3$ mm calculated by Equation (11) when $\theta_0=45°$ and $\beta=1$ mm as illustrated in FIG. 6, gives the maximum aperture width of W=1.3 mm as illustrated in FIG. 8(b). In addition, W decreases in proportion to $|z-z_0|$, and W=1 mm at z=0 mm and 0.6 mm, and W=0 mm at z=−1.1 mm and 1.7 mm. Here, minus z indicates a step difference in a direction opposite to the direction in FIG. 6, that is, a case where the dichroic mirror 19 is shifted in the positive direction of the emission axis with respect to the dichroic mirror 18. Thus, it is found that an effect of the step difference is obtained by setting to 0 mm≤z≤0.6 mm. Generalization of the above is as follows. In FIG. 1, the end of the dichroic mirror M(2) in the positive direction of the emission axis is disposed to be shifted by y in the negative direction of the emission axis, with respect to the end of the dichroic mirror M(1) in the positive direction of the emission axis, and the aperture width W can be increased and the optical path length L can be reduced by setting Equation (17) as follows.

$$0 \le y \le 2 \times x \cos \theta_0 \times \beta \quad \text{[Equation 17]}$$

On the other hand, with 3≤n≤N, the end of the dichroic mirror M(n) in the positive direction of the emission axis is disposed to be shifted by z in the negative direction of the emission axis, with respect to the end of the dichroic mirror M(n−1) in the positive direction of the emission axis, and the aperture width W can be increased and the optical path length L can be reduced by setting Equation (18) as follows.

$$0 \le z \le 2 \times \sin(90 - \theta_0 - \theta_2) / \cos \theta_2 \times \beta \quad \text{[Equation 18]}$$

As described above, a case where a travel direction of a light beam incident to a dichroic-mirror array is perpendicular to an arrangement direction (arrangement axis direction) of the dichroic-mirror array is discussed as illustrated in FIGS. 1, 4 and 6. In contrast to this, as illustrated in FIG. 3, in a case where a travel direction of a light beam incident to a dichroic-mirror array is parallel to an arrangement direction (arrangement axis direction) of the dichroic-mirror array, with 2≤n≤N, an end of a dichroic mirror M(n) in the positive direction of the emission axis is disposed to be shifted by the z by Equation (18) in the negative direction of the emission axis, with respect to an end of a dichroic mirror M(n−1) in the positive direction of the emission axis. This allows the aperture width W to be increased and the optical path length L to be reduced.

Embodiment 2

In Embodiment 1, increase in the aperture width W and reduction in the optical path length L are both accomplished by adjusting the interval x and the step differences y and z of the plurality of dichroic mirrors. In the present embodiment, in a case where the step difference arrangement is not necessarily provided, (y=z=0), that is, even when a plurality of dichroic mirrors are arranged on the same plane, more specifically, even when ends of the dichroic mirrors in the positive direction of the emission axis are arranged on the same plane, the present embodiment proposes means for increasing the aperture width W and reducing the optical path length L.

While FIG. 5 of Embodiment 1 illustrates a result in a case where $\theta_0=45°$, a result in a case where $\theta_0=50°$ is illustrated in FIG. 9. The other conditions in FIG. 5 are the same as those in FIG. 9. Therefore the lower ends of the dichroic mirrors 17 to 20 are arranged in the same plane in both cases. Regardless of that, it becomes clear that the aperture width 63 is only W=0.03 mm in FIG. 5, whereas the aperture width 63 is greatly increased as W=0.9 mm in FIG. 9. The optical path length 64 is not changed in both cases as L=9 mm.

The reason why such effect is obtained will be discussed next. As illustrated in FIG. 5, in the case of $\theta_0=45°$, the light beam travels in the positive direction of the arrangement axis (left direction) in a space between the adjacent dichroic mirrors, whereas the light beam travels in the positive direction of the arrangement axis and the negative direction of the emission axis (upper left direction) inside each dichroic mirror, and thereby, the light beam gradually moves to the negative direction of the emission axis (upper direction) by passing through each dichroic mirror. The above limits the aperture width 63. In contrast to this, as illustrated in FIG. 9, by setting to $\theta_0=50°\geq 45°$, the light beam travels in the positive direction of the arrangement axis and the positive direction of the emission axis (lower left direction) in a space between the adjacent dichroic mirrors, whereas the light beam travels in the positive direction of the arrangement axis and the negative direction of the emission axis (upper left direction) inside each dichroic mirror, and thereby, both are counterbalanced, and therefore the movement of the light beam to the positive or negative direction of the emission axis (vertical direction) by passing through each dichroic mirror is suppressed. The above is led to an increase of the aperture width 63.

Thus, it is favorable that $\theta_0$ is equal to or greater than 45°, and there should be an optimum value of $\theta_0$ that maximizes the aperture width 63. FIG. 10 illustrates a calculation result of W when $\theta_0$ is changed under the conditions of FIGS. 5 and 9. It is found that W increases with $\theta_0$ from $\theta_0=45°$, W becomes a maximum value of 0.92 mm at $\theta_0=52°$, and W decreases with $\theta_0$ to reach approximately zero at $\theta_0=57°$. That is, it is found that W can be increased by setting to $45°\leq\theta_0\leq 57°$.

Next, the above-discussion is generalized. In the same manner as discussion as for FIG. 1, the followings are derived from the geometrical relationships in FIG. 9. The refraction angle $\theta_1$ of the light beam on the incidence surface of the dichroic mirror M(1) is as represented by Equation (1), the incidence angle of the light beam on each incidence surface of the dichroic mirrors M(2) to M(N) is $90-\theta_0$, and the refraction angle $\theta_2$ of the light beam on each incidence surface is as represented by Equation (2). A movement distance S↓ of the light beam, which travels in the positive direction of the arrangement axis and the positive direction of the emission axis (lower left direction) in the space between the adjacent two dichroic mirrors, in the positive direction (lower direction) of the emission axis is obtained by Equation (19).

$$S↓=\tan(2\times\theta_0-90°)\times\tan\theta_0/(\tan\theta_0-\tan(2\times\theta_0-90°))\times(x-\beta/\cos(90°-\theta_0)) \quad\text{[Equation 19]}$$

Meanwhile, a movement distance S↑ of the light beam, which travels in the positive direction of the arrangement axis and the negative direction of the emission axis (upper left direction) inside each dichroic mirror, in the negative direction (upper direction) of the emission axis is obtained by Equation (20).

$$S↑=1/\cos\theta_2\times\beta\times\sin(90°-\theta_0-\theta_2) \quad\text{[Equation 20]}$$

Here, $\beta$ indicates the thickness of each dichroic mirror, and x indicates the interval between the dichroic mirrors. As illustrated in FIG. 9, in order to counterbalance S↓ and S↑, it is optimal to set S↓=S↑. Therefore, $\theta_0$ in the best mode is referred to as $\theta_0$ (BM).

By Equation (19) and Equation (20), where $\beta=1$ mm and x=2.5 mm which are the conditions in FIG. 9, $\theta_0$ (BM)=50° is obtained. That is, the configuration in FIG. 9 is the configuration in the best mode. However, according to FIG. 10, W is maximized at $\theta_0=52°$, which is greater than $\theta_0$(BM) by 2°. This represents that the value of W when $\theta_0$ is slightly larger than $\theta_0$ (BM) can be slightly larger than the value of W at $\theta_0=\theta_0$(BM). That is, it is better that S↓ is made somewhat larger than S↑ and the light beam travels progressively downward to the lower left.

From the above, with respect to a standard case where $\theta_0=45°$ in the related art, a condition for increasing W is represented by Equation (21).

$$45°\leq\theta_0\leq 2\times\theta_0(BM)-45° \quad\text{[Equation 21]}$$

In addition, considering the above-described deviation of 2°, more accurate condition is represented by Equation (22).

$$45°\leq\theta_0 2\times\theta_0(BM)-43° \quad\text{[Equation 22]}$$

Embodiment 3

A light beam which is incident to a dichroic-mirror array is rarely a perfect parallel light beam but is a non-parallel light beam in many cases. That is, as the light beam travels (as the optical path length becomes larger), the diameter of the light beam is not constant but is decreased and/or increased. Accordingly, in the above embodiments, configurations of dichroic-mirror arrays that reduce the optical path length and increase the aperture width are proposed so as to be able to accept various light beams. In the present embodiment, a light beam is specifically defined, and it will be discussed whether or not a dichroic-mirror array can accept the light beam.

An example of a specific light beam is defined in FIG. 11. As illustrated in FIG. 11 (a), light emitted from a light-emission point 1 having a diameter d is condensed by a condensing lens 2 having a focal length f and an effective diameter D. The condensed light is focused at a position that is at an optical path length g from the condensing lens 2 to obtain a light-emission-point image 7. At this time, the optical path length between the light-emission point 1 and the condensing lens 2 is $f+f^2/(g-f)$, and an image magnification is represented by Equation (23).

$$m=(g-f)/f \quad\text{[Equation 23]}$$

Accordingly, the diameter d' of the light-emission-point image 7 is represented by Equation (24).

$$d'=m\times d=(g-f)/f\times d \quad \text{[Equation 24]}$$

Here, as illustrated in FIG. 11 (*a*), an s axis is defined along an optical axis of the condensing lens and a t axis is defined in a direction perpendicular to the s axis, with the center of the condensing lens 2 as a point of origin of the both axes. However, in a case where a direction of an optical axis of the light beam, which is emitted from the light-emission point 1 and condensed by the condensing lens 2, is changed, directions of the s axis and the t axis are equivalently changed. A sensor for detecting the light beam is set at any location on the s axis and is not set at a specific location. The light emitted from the left end of the light-emission point 1 and condensed by the condensing lens 2 is indicated by a solid line, travels while reducing a diameter thereof, is focused at the right end of the light-emission-point image 7, and travels while enlarging a diameter thereof thereafter. The light emitted from the right end of the light-emission point 1 and condensed by the condensing lens 2 is indicated by a dashed line, travels while reducing a diameter thereof, is focused at the left end of the light-emission-point image 7, and travels while enlarging a diameter thereof thereafter. That is, the light beam emitted from the light-emission point 1 and condensed by the condensing lens 2 is indicated by an envelope configured by a dashed line 88 and a solid line 90 between the condensing lens 2 and the light-emission-point image 7, and a dashed line 89 and a solid line 91 after the light-emission-point image 7. The envelope is uniquely determined by d, f, D, and g. The diameter $\phi(s)$ of the light beam at any s coordinate when $0 \leq s \leq g$ (between the condensing lens 2 and the light-emission-point image 7) is given by Equation (25).

$$\phi(s)=((-D-d)\times f+d\times g)/(f\times g)\times s+D \quad \text{[Equation 25]}$$

The diameter $\phi(s)$ of the light beam at any s coordinate when g s (after the light-emission-point image 7) is given by Equation (26).

$$\phi(s)=((D-d)\times f+d\times g)/(f\times g)\times s-D \quad \text{[Equation 26]}$$

Meanwhile, as illustrated in FIG. 11(*b*), a section of the above-described light beam with a section length $\Delta s$ in the s axis direction is selected so that a maximum value of the diameter of the section is minimized. Then, the maximum value of the diameter of the section is defined as $\phi m(\Delta s)$ (Hereinafter, referred to as a maximum diameter). By using Equation (25) and Equation (26), a relationship between $\Delta s$ and $\phi m(\Delta s)$ for any d, f, D, and g can be obtained.

The light beam expressed by Equation (25) and Equation (26) of FIG. 11 described above and $\phi m(\Delta s)$ derived from the equations are merely examples, the same discussion can be established by obtaining a relationship between $\Delta s$ and $\phi m$ (As) even for other light beams, and it is possible to select a dichroic-mirror array that is able to accept such a light beam. For example, in FIG. 11, it is possible to consider a case in which a pinhole or a slit is disposed at a rear stage (a side opposite to the light-emission point 1) of the condensing lens 2, and thereby a part of the light beam condensed by the condensing lens 2 is incident on and detected by a sensor disposed at a rear stage (a side opposite side to the condensing lens 2) of the pinhole or the slit. In such a case, it is necessary to select a dichroic-mirror array by using the relationship between $\Delta s$ and $\phi m(\Delta s)$ for the part of the light beam.

Next, conditions for a dichroic-mirror array that can accept the light beam defined as described above will be determined. That is, conditions for a dichroic-mirror array that may divide the light beam into a plurality of light beams having different wavelength bands without vignetting of the light beam and thereby loss of a part of the light beam will be determined. When N, $\theta_0$, $n_0$, $\alpha$, and $\beta$ are given as conditions for a dichroic-mirror array, the best mode, in which the maximum value $W_0$ of the aperture width W is obtained by Equation (4) and the minimum value $L_0$ of the optical path length L is obtained by Equation (7), is proposed. Thus, the above conditions are $\phi m(\Delta s) \leq W_0$ and $L_0 \leq \Delta s$. That is, Equation (27) and Equation (28) may be satisfied.

$$\phi m(\Delta s) \leq a_W \times \alpha + b_W \times \beta \quad \text{[Equation 27]}$$

$$\Delta s \geq a_L \times \alpha + b_L \times \beta \quad \text{[Equation 28]}$$

By transforming Equation (27) and Equation (28), Equation (29) and Equation (30) are obtained.

$$-b_W/a_W \times \beta + 1/a_W \times \phi m(\Delta s) \leq \alpha \quad \text{[Equation 29]}$$

$$\alpha \leq -b_L/a_L \times \beta + 1/a_L \times \Delta s \quad \text{[Equation 30]}$$

Furthermore, by using Equation (3), Equation (31) and Equation (32) are obtained.

$$(\sin \theta_0 - b_W/a_W \times \cos \theta_0) \times \beta + \cos \theta_0/a_W \times \phi m(\Delta s) \leq x \quad \text{[Equation 31]}$$

$$x \leq (\sin \theta_0 - b_L/a_L \times \cos \theta_0) \times \beta + \cos \theta_0/a_L \times \Delta s \quad \text{[Equation 32]}$$

By setting $\alpha$ to satisfy Equation (29) and Equation (30) and by setting x to satisfy Equation (31) and Equation (32) when N, $\theta_0$, $n_0$, and $\beta$ are given, a dichroic-mirror array can satisfactorily divide the light beam with $\phi m(\Delta s)$ without vignetting.

FIG. 12 illustrates calculation results in a case where d=0.05 mm, f=1.5 mm, D=1 mm, and g=20 mm. Accordingly, m=12 from Equation (23) and d'=0.62 mm from Equation (24). In FIG. 12 (*a*), dashed lines 88 and 89 and the solid lines 90 and 91 illustrate a relationship between s and t for the dashed lines 88 and 89 and the solid lines 90 and 91 in FIG. 11 (*a*), respectively, and a polygonal line 92 illustrates a relationship between s and $\phi(s)$, which is obtained by Equation (25) and Equation (26). The diameter of the light beam, $\phi(s)$ decreases with s from $\phi(0 \text{ mm})=1$ mm at the location of the condensing lens 2, reaches the minimum of $\phi(20 \text{ mm})=0.62$ mm at a location of the light-emission-point image 7, increases with s, and becomes, for example, $\phi(50 \text{ mm})=3.0$ mm.

FIG. 12 (*b*) illustrates the calculated result of $\phi m(\Delta s)$ with $\Delta s$ based on the above results. For example, $\phi m(0 \text{ mm})=0.62$ mm when the above section is set to s=20 mm (20 mm s 20 mm) (a location of the light-emission-point image 7), $\phi m(20 \text{ mm})=0.94$ mm when the above section is set to 4 mm s 24 mm, and $\phi m(50 \text{ mm})=3.0$ mm when the above section is set to 0 s 50 mm.

In a case where the dichroic-mirror array is set to N=4, $\theta_0=45°$, $n_0=1.46$, and $\beta=1$ mm, a region on an upper side of a polygonal line †93 in FIG. 12(*c*) represents a relationship between $\Delta s$ and x that satisfies Equation (31), based on the above results. In addition, a region on a lower side of a straight line ↓94 in FIG. 12 (*c*) represents a relationship between $\Delta s$ and x that satisfies Equation (32). Consequently, it is possible to have x that satisfies Equation (31) and Equation (32) when $\Delta s \geq 9$ mm. That is, it is possible to have a dichroic-mirror array that satisfactorily divides the light beam.

For example, if $\Delta s=10$ mm, $\phi m(10 \text{ mm})=0.78$ mm from FIG. 12(*b*), and a dichroic-mirror array with any x when 1.9 mm×2.2 mm as shown in FIG. 12(*c*) is available. Furthermore, for example, when x=2 mm, in the best mode, α=1.8 mm from Equation (3), W=0.9 mm from Equation (4) to Equation (6), L=9.4 mm from Equation (7) to Equation (9), y=0.7 mm from Equation (10), and z=0.3 mm from Equation (11). Consequently, because L As and ϕm(Δs)≤W are established, it is found that the dichroic-mirror array described above can be installed in the section of Δs and can function satisfactorily.

FIG. 13 illustrates results in a case where d=0.05 mm in FIG. 12 is changed to d=0.25 mm. The other conditions are the same as in FIG. 12. Accordingly, m=12 from Equation (23) and d'=3.1 mm from Equation (24). As compared with FIG. 12(a), ϕ(s) increases more rapidly with s in FIG. 13(a). ϕ(s) increases with s from ϕ(0 mm)=1 mm at the location of the condensing lens 2, to ϕ(20 mm)=3.1 mm at the location of the light-emission-point image 7, and further, for example, to ϕ(50 mm)=9.2 mm. In the same manner, ϕm(Δs) in FIG. 13(b) also increases more rapidly with Δs than in the case of FIG. 12(b). For example, ϕ(0 mm)=1 mm when the above section is set to s=0 mm (0 mm≤s≤0 mm) (a location of the condensing lens 2), ϕm(20 mm)=3.1 mm when the above section is set to 0 mm≤s≤20 mm, and ϕm(50 mm)=9.2 mm when the above section is set to 0≤s≤50 mm.

As a result of the above, the overlapped region, where both Equation (31) and Equation (32) are satisfied, on the upper side of the polygonal line ↑93 and on the lower side of the polygonal line ↓94 in FIG. 13(c) is narrowed compared to the case of FIG. 12(c). However, it is possible to have x that satisfies Equation (31) and Equation (32) when Δs≥17 mm. That is, it is possible to have a dichroic-mirror array that satisfactorily divides the light beam. For example, if Δs=20 mm, ϕm(20 mm)=3.08 mm from FIG. 13 (b), and therefore a dichroic-mirror array with any x when 4.2 mm≤x≤4.7 mm as shown in FIG. 13(c) is available.

FIG. 14 illustrates results in a case where d=0.25 mm in FIG. 13 is changed to d=0.5 mm. The other conditions are the same as in FIG. 13. Accordingly, m=12 from Equation (23) and d'=6.2 mm from Equation (24). Both ϕ(s) in FIG. 14(a) and ϕm(Δs) in FIG. 14(b) increase more rapidly with s than those in FIGS. 13 (a) and 13(b), respectively. As a result, an overlapped region, where both Equation (31) and Equation (32) are satisfied, on the upper side of the polygonal line ↑93 and on the lower side of the polygonal line ↓94 in FIG. 14 (c) is not obtained. That is, it is not possible to have a dichroic-mirror array that satisfactorily divides the light beam under the conditions of N=4, θ₀=45°, n₀=1.46, and β=1 mm.

FIG. 15(a) illustrates a result in a case where N=4 in FIG. 12(c) is changed to N=8. This is carried out to increase the number of detectable colors from four to eight by increasing the number of dichroic mirrors in the dichroic-mirror array from four to eight, and thereby the number of division of the light beam from four to eight. The other conditions are the same as those in FIG. 12(c). As is apparent from Equation (7) to Equation (9), an increase of N brings an increase of L, and a range of x that satisfies Equation (32) is narrowed. Actually, the overlapped region (where both Equation (31) and Equation (32) are satisfied) on the upper side of the polygonal line ↑93 and on the lower side of the polygonal line ↓94 in FIG. 15(a) is narrowed compared with the overlapped region in FIG. 12(c). Here, the polygonal line ↓94 changes with N via Equation (8) and Equation (9), whereas the polygonal line ↑93 does not change with N.

FIG. 15(b) illustrates a result in a case where N=8 in FIG. 15 (a) is changed to N=10, and the above overlapped region is further narrowed. In addition, FIG. 15(c) is a result in a case where N=8 in FIG. 15 (a) is changed to N=12, and, in the same manner as in the case of FIG. 14(c), the above overlapped region does not exist.

FIG. 16 illustrates results in a case where g=20 mm in FIG. 15 (c) is changed to g=50 mm as an example of countermeasure against the result in FIG. 15(c). The other conditions are the same as those in FIG. 15(c). Accordingly, m=32 from Equation (23) and d'=1.6 mm from Equation (24). As illustrated in FIG. 16(a), ϕ(s) increases with s from ϕ(0 mm)=1 mm at the location of the condensing lens 2, to 4)(50 mm)=1.6 mm at the location of the light-emission-point image 7. In addition, as illustrated in FIG. 13(b), ϕm(Δs) increases with Δs from ϕm(0 mm)=1 mm to ϕm(50 mm)=1.6 mm.

As a result, unlike the case of FIG. 15(c), the overlapped region (where both Equation (31) and Equation (32) are satisfied) on the upper side of the polygonal line ↑93 and on the lower side of the polygonal line ↓94 exists. For example, if Δs=50 mm, ϕm (50 mm)=1.6 mm from FIG. 16 (b), and therefore a dichroic-mirror array with any x when 2.7 mm≤x≤3.6 mm as shown in FIG. 16(c) is available.

Embodiment 4

In the above embodiments, a case where a single dichroic-mirror array divides a single light beam into a plurality of light beams having different wavelength bands is mainly described, but the present invention is not limited thereto. In the present embodiment, an example will be described in which a single dichroic-mirror array divides a plurality of light beams respectively into a plurality of light beams having different wavelength bands in parallel.

FIG. 17 illustrates an apparatus that performs multicolor detection of each light emitted from a plurality of light-emission points 1 using a condensing-lens array and a dichroic-mirror array. FIG. 17(a) is a schematic diagram of the multicolor detection apparatus viewed from a direction perpendicular to a plane including each optical axis of a plurality of condensing lenses 2. FIG. 17(b) is a schematic sectional diagram of the multicolor detection apparatus, by a plane including an axis of one condensing lens 2, and perpendicular to an arrangement direction of the condensing-lens array. FIG. 17(c) is an explanatory diagram illustrating an image 29 which is detected by a two-dimensional sensor 30. Here, an example in which four-color detection is performed will be described.

First, as illustrated in FIG. 17(a), for example, lights emitted from a light-emission-point array in which four light-emission points 1 are arranged are individually condensed in parallel by condensing lenses 2 of a condensing-lens array 8 in which the four condensing lenses 2 are arranged to form light beams 9. Next, light beams 9 are made to pass through a single longpass filter 10 in parallel and made to be incident to a single dichroic-mirror array in parallel. The longpass filter 10 is for blocking irradiation light causing the light-emission points 1 to emit lights and can be omitted when it is not necessary. For example, the dichroic-mirror array is the same as the dichroic-mirror array illustrated in FIG. 4. However, a width of each dichroic mirror in the arrangement direction of the light-emission-point array is sufficiently lengthened such that the plurality of the light beams are divided by each dichroic mirror configuring the dichroic-mirror array in parallel. Of course, the dichroic-mirror array may be replaced with any other dichroic-mirror array proposed in the present invention.

As illustrated in FIG. 17(b), the dichroic mirrors 17, 18, 19, and 20 are arranged in a direction perpendicular to both the optical axes and the arrangement direction of the condensing lenses 2. Here, the dichroic mirror 20 may be a total reflection mirror. Each of light beams 9, incident to the dichroic-mirror array, is divided by the dichroic mirror 17 in parallel into a light beam 21 passing through the dichroic mirror 17 and a light beam reflected by the dichroic mirror 17. Each of the light beams reflected by the dichroic mirror 17 is divided by the dichroic mirror 18 in parallel into a light beam passing through the dichroic mirror 18 and a light beam 22 reflected by the dichroic mirror 18. Each of the light beams passing through the dichroic mirror 18 is divided by the dichroic mirror 19 in parallel into a light beam passing through the dichroic mirror 19 and a light beam 23 reflected by the dichroic mirror 19. And each of the light beams passing through the dichroic mirror 19 is divided by the dichroic mirror 20 in parallel into a light beam (not illustrated) passing through the dichroic mirror 20 and a light beam 24 reflected by the dichroic mirror 20. Then, the light beams 21, 22, 23, and 24 originating from the respective light-emission points 1 travel in the same direction as the optical axes of the respective condensing lenses 2, and are incident on the two-dimensional sensor 30 in parallel. As a result, light-emission-point images 25, 26, 27, and 28 originating from the respective light-emission points 1 are formed. Here, the respective light-emission-point images are not necessarily just focused images of the light-emission points, and may be defocused images. As illustrated in FIG. 17(a), the four light beams 9 are incident in parallel at different locations of the single longpass filter 10 and at different locations of the single dichroic mirror 17. As for the dichroic mirrors 18, 19, and 20 and the two-dimensional sensor, the similar parallel incidences of the light beams are carried out as described above. As illustrated in FIG. 17 (c), a total of 16 light-emission-point images 25 to 28 obtained by dividing the light beams emitted from the four light-emission points 1 respectively into the four light beams are obtained on the image 29 of the two-dimensional sensor 30. Since the 16 light-emission-point images are separately detected, it is possible to simultaneously detect four colors of the lights emitted from the four light-emission points 1.

By controlling transmission characteristics and reflection characteristics of the longpass filter 10 and the dichroic mirrors 17 to 20, for example, the light beam 21 has mainly a component of A fluorescence, the light beam 22 has mainly a component of B fluorescence, the light beam 23 has mainly a component of C fluorescence, and the light beam 24 has mainly a component of D fluorescence, and the fluorescence of A, B, C, and D can be detected by detecting intensities of the light-emission-point images 25, 26, 27, and 28. Any design of the wavelength bands of the light beams 25, 26, 27, and 28 is possible, but it is easier to design the dichroic mirrors when these are arranged in order of wavelength. That is, it is favorable to be either a central wavelength of A fluorescence>a central wavelength of B fluorescence>a central wavelength of C fluorescence>a central wavelength of D fluorescence, or the central wavelength of A fluorescence<the central wavelength of B fluorescence<the central wavelength of C fluorescence<the central wavelength of D fluorescence.

In addition, although not illustrated in FIG. 17, it is effective that bandpass filters or color glass filters having different spectroscopic characteristics are arranged at locations of the light beams 21, 22, 23, and 24, to compensate or enhance the spectroscopic characteristics of the dichroic mirrors 17 to 20. Although not illustrated in FIG. 17, it is also effective to provide an irradiation light such as an excitation light to cause light to be emitted from each of the light-emission points 1. It is advantageous to increase detection sensitivity for the irradiation light to be irradiated in a direction perpendicular to an optical axis of each of the condensing lenses 2 without using each of the condensing lenses 2, because a ratio of the irradiation light incident on a sensor via each of the condensing lenses 2 to light emitted from each of the light-emission points 1 can be reduced. On the other hand, it is also effective to adopt a so-called epi-illumination light-emission detection configuration. In this configuration, another dichroic mirror is disposed instead of the longpass filter 10, the irradiation light is reflected by the dichroic mirror and then is focused by each of the condensing lenses 2 to irradiate each of the light-emission points 1, the light emitted from each of the light-emission points 1 is condensed by the same condensing lens 2 and then is passed through the dichroic mirror, and the light is detected by a multicolor detection apparatus which is the same as the apparatus illustrated in FIG. 17.

Next, in the multicolor detection apparatus illustrated in FIG. 17, conditions for highly sensitive and low crosstalk detection of lights emitted from a plurality of light-emission points 1 will be discussed. FIG. 18 is a sectional diagram including optical axes of optical systems where lights emitted from the two adjacent light-emission points 1 are individually condensed by condensing lenses 2 to obtain light-emission-point images 7 of the light-emission points 1 at a location of a sensor. In the present embodiment, the expression "light-emission-point image" does not necessarily mean a just focused image of a light-emission point, but generally mean a cross section of a light beam obtained by condensing light emitted from a light-emission point at a predetermined location. A diameter of the light-emission point 1 is referred to as d, a focal length of the condensing lens 2 is referred to as f, an effective diameter of the condensing lens 2 is referred to as D, an interval between the light-emission points 1 and an interval between condensing lenses 2 are referred to as p, a diameter of a detection region of the sensor for the light-emission point is referred to as D, an optical path length between the condensing lens 2 and the sensor is referred to as g, and a diameter of the light-emission-point image 7 at the sensor location is referred to as d'. When a distance between the light-emission point 1 and the condensing lens 2 is adjusted so that the light emitted from the light-emission point 1 is just focused at the sensor location by the condensing lens 2, the diameter d' of the light-emission-point image 7 becomes the minimum value. In that case, the image magnification m is as illustrated in Equation (23), and the diameter d' of the light-emission-point image 7 is as illustrated in Equation (24). However, the light-emission-point image 7 may not necessarily be just focused at the sensor location, and in this case, the above description is not applicable.

The light-emission points 1 viewed from the optical axis direction are illustrated on a lower side of the optical systems in FIG. 18, and the light-emission-point images 7 viewed from the optical axis direction are illustrated on an upper side thereof. In each drawing of the present specification, the light-emission points 1 and the light-emission-point images 7 are drawn in circular shapes, respectively, but those are not limited to the circular shapes in reality, and other shapes may be used. Generally, the diameter d of the light-emission point 1 and the diameter d' of the light-emission-point image 7 are referred to as widths of the light-emission point 1 and the light-emission-point image 7 in the arrangement direction of the light-emission points 1 and the light-emission-point images 7, respectively. In addition, as will be described below, there is a case where there are a plurality of optical path lengths between the condensing lenses 2 and the sensor in the same light-emission-detection apparatus. In this case, a maximum value of the optical path lengths between the condensing lenses 2 and the sensor is referred to as an optical path length g, and then Equation (33) to Equation (49) may be established as follows.

First, a condition for obtaining high sensitivity will be discussed. A light condensing efficiency of the light emitted from the light-emission point 1 by the condensing lens 2 can be expressed by an F-number of the condensing lens 2, which is F=f/D (the light condensing efficiency is proportional to $1/F^2$). In order to satisfy F≤2.8, f≤2.8× D may be satisfied. Meanwhile, in order to configure the condensing-lens array, Equation (33) is required.

$$p \geq D \qquad \text{[Equation 33]}$$

Thus, Equation (34) is a condition for F≤2.8.

$$f \leq 2.8 \times p \qquad \text{[Equation 34]}$$

In the same manner, in order to satisfy F≤2.0, 1.4, 1.0, and 0.7, Equations (35), (36), (37) and (38) are conditions.

$$f \leq 2.0 \times p \qquad \text{[Equation 35]}$$

$$f \leq 1.4 \times p \qquad \text{[Equation 36]}$$

$$f \leq 1.0 \times p \qquad \text{[Equation 37]}$$

$$f \leq 0.7 \times p \qquad \text{[Equation 38]}$$

Equation (34) to Equation (38) described above are correct when the distance between the light-emission point 1 and the condensing lens 2 can be approximated by f, but more strictly, the equations can be expressed as follows. When the light emitted from the light-emission point 1 is just focused at the optical path length g by the condensing lens 2, the distance between the light-emission point 1 and the condensing lens 2 is $f^2/(g-f)+f$, and thereby, the effective F-number of the condensing lens 2 can be expressed as $F'=(f^2/(g-f)+f)/D$. Thus, in order to satisfy F'≤2.8, 2.0, 1.4, 1.0, and 0.7, following Equations (39), (40), (41), (42) and (43) are strict conditions, respectively.

$$f \leq (1/(2.8 \times p)+1/g)^{-1} \qquad \text{[Equation 39]}$$

$$f \leq (1/(2.0 \times p)+1/g)^{-1} \qquad \text{[Equation 40]}$$

$$f \leq (1/(1.4 \times p)+1/g)^{-1} \qquad \text{[Equation 41]}$$

$$f \leq (1/(1.0 \times p)+1/g)^{-1} \qquad \text{[Equation 42]}$$

$$f \leq (1/(0.7 \times p)+1/g)^{-1} \qquad \text{[Equation 43]}$$

Next, a condition for obtaining low crosstalk will be discussed. As illustrated in FIG. 18, in a case where the light-emission-point images 7 of the adjacent light-emission points 1 do not overlap each other, crosstalk does not occur. However, as illustrated in FIG. 19, if the light-emission-point images 7 overlap each other, crosstalk occurs. Hereinafter, the crosstalk is expressed by a ratio X of an overlapping area of the adjacent light-emission-point images 7 to an area of the light-emission-point image 7 in FIG. 19. In order to have the crosstalk of X or less, when Equation (44) is defined, Equation (45) is required.

$$X=1/\pi \times (\cos^{-1}(V^2/2-1)-\sin(\cos^{-1}(V^2/2-1))) \qquad \text{[Equation 44]}$$

$$V \leq 2 \times p/d' \qquad \text{[Equation 45]}$$

Equation (45) is transformed to Equation (46) by using Equation (24).

$$f \geq 1/((2 \times p)/(V \times d)+1) \times g \qquad \text{[Equation 46]}$$

In order to perform detection of the light emitted from the light-emission point 1 without being influenced by the lights emitted from the adjacent light-emission points 1, it is necessary for the distance between the two light-emission-point images 7 to be larger than a radius (or half of the diameter) of the light-emission point in FIG. 19. This condition is expressed as X=0.39 (39%) and V=1 by using Equation (44) and Equation (45), and Equation (46) can be expressed by Equation (47).

$$f \geq 1/(2 \times p/d+1) \times g \qquad \text{[Equation 47]}$$

In order to more effectively and independently detect the lights emitted from the plurality of thelight-emission points 1, it is desirable to set the total ratio of crosstalk from both sides to 50% or less. This condition is expressed as X=0.25 (25%) and V=1.27 by using Equation (44) and Equation (45), and Equation (46) can be expressed by Equation (48).

$$f \geq 1/((2 \times p)/(1.27 \times d)+1) \times g \qquad \text{[Equation 48]}$$

More desirably, it is better to set the crosstalk to 0%. This condition is expressed as X=0 (0%) and V=2 by using Equation (44) and Equation (45), and Equation (46) can be expressed by Equation (49).

$$f \geq 1/(p/d+1) \times g \qquad \text{[Equation 49]}$$

As described above, it is possible to obtain desirable light condensing efficiency and sensitivity by selecting g and f that satisfy any one of Equation (34) to Equation (43) with respect to the given p and d. Meanwhile, it is possible to obtain desirable crosstalk by selecting g and f that satisfy any one of Equation (47) to Equation (49) with respect to the given p and d. That is, it is possible to obtain both sensitivity and crosstalk which share a trade-off relationship at a desirable level by selecting g and f that satisfy both one of Equation (34) to Equation (43) and one of Equation (47) to Equation (49).

In the present specification, a condensing lens 2 is basically a circular lens having the effective diameter D, but is not limited to the circular lens. Generally, the effective diameter D of the condensing lens 2 indicates the width of the condensing lens 2 in the arrangement direction of the light-emission points 1 and the condensing lenses 2. The width of the condensing lens 2 in the direction orthogonal to the arrangement direction is not limited thereto. The condensing lens 2 may have a circular shape, an elliptical shape, a square shape, a rectangular shape, or any other shape. Since the diameter d' of the light-emission-point image 7 is irrelevant to D, the conditions of Equation (44) to Equation (49) described above relating to the crosstalk are established as it is regardless of the width in the direction orthogonal to the arrangement direction of the condensing lenses 2. Meanwhile, if the width in the direction orthogonal to the arrangement direction of the condensing lenses 2 is larger than the effective diameter D, the F-number can be reduced less than F=f/D, that is, the light condensing efficiency can be further increased. In this case, the conditions of Equation (34) to Equation (43) described above relating to sensitivity can cause even higher relative detection light amount and sensitivity to be achieved.

FIG. 20 is a diagram with a horizontal axis g and a vertical axis f, showing conditions that satisfy Equation (34) to Equation (43) and Equation (47) to Equation (49) in a case where p=1 mm and d=0.05 mm as a typical example. The numbers illustrated in the curves or the straight lines indicate boundary lines of the corresponding Equations, a symbol ↓ (down arrow) indicates an area below the boundary line, and a symbol ↑ (up arrow) indicates an area above the boundary line. For example, in order to satisfy Equation (34) which is a condition for F≤2.8, g and f in the region on a lower side than the straight line l(34) in FIG. 20 may be used. Meanwhile, in order to satisfy Equation (48) which is a condition for crosstalk of 25% or less, g and f in the region on a upper side than the straight line t(48) in FIG. 20 may be used. That is, in order to obtain F≤2.8 and crosstalk of 25% or less, g and f in an overlapped region on the lower side than the straight line l(34) and in the region on the upper side than the straight line t(48) in FIG. 20 may be used. As is apparent from the magnitudes of g and f, a light emission detection apparatus that uses g and f illustrated in FIG. 20 can be significantly miniaturized, besides the apparatus achieves both high sensitivity and low crosstalk.

In the multicolor detection apparatus illustrated in FIG. 17, the diameter d of each light-emission point 1, the distance p between the light-emission points 1 and the condensing lenses 2, the focal length f and the effective diameter D of each condensing lens 2, and the optical path length g between each condensing lens 2 and the sensor 30 satisfy the above relational equations, and thereby, a predetermined high sensitivity and low crosstalk are realized, and miniaturization and cost reduction of the detection apparatus are realized. Here, characteristics that reduce the size and cost of the multicolor detection apparatus by the dichroic-mirror array illustrated in FIG. 17 for the light-emission-point array are summarized in following (1) to (10). All the characteristics are not necessarily satisfied, and it is effective to satisfy even one of those.

(1) With respect to M light-emission points of a light-emission-point array, M light beams obtained by individually condensing lights emitted from the light-emission points using a condensing-lens array are respectively divided into N light beams having different wavelength components and travel in the same direction respectively.

(2) With respect to M light-emission points of a light-emission-point array, M light beams obtained by individually condensing lights emitted from the light-emission points using a condensing-lens array are respectively divided into N light beams having different wavelength components and travel in an optical axis direction of each condensing lens respectively.

(3) With respect to M light-emission points of a light-emission-point array, a direction in which M light beams obtained by individually condensing lights emitted from the light-emission points using a condensing-lens array are divided into light beams having different wavelength components is perpendicular to an arrangement direction of the light-emission-point array and the condensing-lens array.

(4) With respect to M light-emission points of a light-emission-point array, a direction in which M light beams obtained by individually condensing lights emitted from the light-emission points using a condensing-lens array are divided into light beams having different wavelength components is perpendicular to an optical axis of each condensing lens.

(5) With respect to M light-emission points of a light-emission-point array, N dichroic mirrors that divide M light beams obtained by individually condensing lights emitted from the light-emission points using a condensing-lens array into light beams having different wavelength components are arranged in a direction perpendicular to an arrangement direction of the light-emission-point array and the condensing-lens array.

(6) With respect to M light-emission points of a light-emission-point array, N dichroic mirrors that divide M light beams obtained by individually condensing lights emitted from the light-emission points using a condensing-lens array into light beams having different wavelength components are arranged in a direction perpendicular to an optical axis of each condensing lens.

(7) With respect to M light-emission points of a light-emission-point array, M×N light beams obtained by dividing M light beams obtained by individually condensing lights emitted from the light-emission points using a condensing-lens array into N light beams having different wavelength components are directly incident on a sensor without being condensed again.

(8) With respect to M light-emission points of a light-emission-point array, an optical axis of each condensing lens of a condensing-lens array that condenses lights emitted from the light-emission points is perpendicular to a sensor surface.

(9) M light beams obtained by individually condensing lights emitted from M light-emission points of a light-emission-point array are incident in parallel on each dichroic mirror of N dichroic mirrors with different spectroscopic characteristics.

(10) M×N light beams obtained by dividing M light beams obtained by individually condensing lights emitted from M light-emission points of a light-emission-point array respectively into N light beams having different wavelength components, are incident in parallel on a single sensor.

Meanwhile, each light beam having the above-described characteristics needs to be satisfactorily divided by a dichroic-mirror array without loss due to vignetting in the dichroic-mirror array. This is the same discussion as in Embodiment 3. It is necessary to satisfy ϕm(Δs)≥MAX(D, d') in Equation (27), and Δs≤g in Equation (28). Here, MAX(D,d') is a function indicating either D or d' whichever is larger. Based on the above, the conditions are as follows.

$$D \leq a_W \times \alpha + b_W \times \beta \qquad \text{[Equation 50]}$$

$$d' \leq a_W \times \alpha + b_W \times \beta \qquad \text{[Equation 51]}$$

$$g \geq a_L \times \alpha + b_L \times \beta \qquad \text{[Equation 52]}$$

These are transformed to Equation (53), Equation (54), and Equation (55) in the same way as Equation (31) and Equation (32).

$$(\sin \theta_0 - b_W/a_W \times \cos \theta_0) \times \beta + \cos \theta_0/a_W \times D \leq x \qquad \text{[Equation 53]}$$

$$(\sin \theta_0 - b_W/a_W \times \cos \theta_0) \times \beta + \cos \theta_0/a_W \times d' \leq x \qquad \text{[Equation 54]}$$

$$x \leq (\sin \theta_0 - b_L/a_L \times \cos \theta_0) \times \beta + \cos \theta_0/a_L \times g \qquad \text{[Equation 55]}$$

The present invention is not limited to the above-described embodiments and includes various modification examples. For example, the above-described embodiments are described in detail so as to explain the present invention in an easy-to-understand manner, and are not necessarily limited to those having all the configurations described. In addition, a part of the configuration of a certain embodiment can be replaced by the configuration of another embodiment, and a configuration of another embodiment can be added to a configuration of a certain embodiment. In addition, it is possible to add, remove, and replace other configurations with respect to a part of the configuration of each embodiment.

REFERENCE SIGNS LIST

1: light-emission point, 2: condensing lens, 6: light beam, 7: light-emission-point image, 8: condensing-lens array, 9:

light beam, 10: longpass filter, 17-20: dichroic mirror, 30: two-dimensional sensor, 63: aperture width, 64: optical path length, 70: light beam

The invention claimed is:

1. A dichroic-mirror array in which a plurality of dichroic mirrors of numbers-1, 2, ..., N are arranged in a numerical order in a first direction with $N \geq 2$,
   wherein each of normal vectors on front surfaces of the plurality of dichroic mirrors is configured by a sum of a positive component in the first direction and a negative component in a second direction perpendicular to the first direction,
   wherein the normal vectors are substantially parallel to each other, and
   wherein, with $0 \leq \theta_0 \leq 90°$, when an average of angles which are formed by the normal vectors and a direction opposite to the second direction is referred to as $\theta_0$, an average of refractive indices of substrates of the dichroic mirrors is referred to as $n_0$, an average of widths of the substrates of the dichroic mirrors is referred to as $\alpha$, an average of thicknesses of the substrates of the dichroic mirrors is referred to as $\beta$, and an average of intervals between the dichroic mirrors is referred to as x, and with $2 \leq n \leq N$, when an average of distances by which an end of the nth dichroic mirror in the second direction is shifted in the direction opposite to the second direction with respect to an end of the (n−1)th dichroic mirror in the second direction is referred to as yz, $\theta_0$, $n_0$, $\alpha$, $\beta$, x, and yz satisfy a predetermined relationship so as to increase an aperture width of the dichroic-mirror array or reduce an optical path length thereof.

2. The dichroic-mirror array according to claim 1, wherein, when $\theta_2 = \sin^{-1}(1/n_0 \times \sin(90° - \theta_0))$, $0 \leq yz \leq 2 \times \sin(90° - \theta_0 - \theta_2)/\cos\theta_2 \times \beta$ is satisfied.

3. The dichroic-mirror array according to claim 1, wherein, with $\theta_2 = \sin^{-1}(1/n_0 \times \sin(90° - \theta_0))$, when n=2, $0 \leq yz \leq 2\times\cos\theta_0 \times \beta$ is satisfied, and when $3 \leq n \leq N$, $0 \leq yz \leq 2\times\sin(90°-\theta_0-\theta_2)/\cos\theta_2 \times\beta$ is satisfied.

4. The dichroic-mirror array according to claim 1, wherein $\cos\theta_0 \times \alpha \leq \cos\theta_0 \times \alpha + 2\times\sin\theta_0 \times \beta$ is satisfied.

5. The dichroic-mirror array according to claim 1, wherein, with $\theta_2 = \sin^{-1}(1/n_0\times\sin(90°-\theta_0))$, $S\uparrow = \tan(2\times\theta_0 - 90°) \times \tan\theta_0/(\tan\theta_0 - \tan(2\times\theta_0 - 90°))\times(x - \cos(90°-\theta_0))$, and $S\uparrow = 1/\cos\theta_2 \times \beta\times\sin(90°-\theta_0-\theta_2)$, when $\theta_0$ that satisfies $S\uparrow = S\downarrow$ is referred to as $\theta_0(BM)$, $45° \leq \theta_0 \leq 2\times\theta_0(BM) - 43°$ is satisfied.

6. A light detection apparatus comprising:
   a dichroic-mirror array; and
   a sensor,
   wherein a maximum diameter of a light beam which is incident on the sensor to be detected, in an optical path section with an optical path length $\Delta s$, is given as $\phi m(\Delta s)$ as a function of $\Delta s$,
   wherein the dichroic-mirror array is configured by arranging a plurality of dichroic mirrors of numbers 1, 2, ..., N in a numerical order in a first direction with $N \geq 2$,
   wherein each of normal vectors on front surfaces of the plurality of dichroic mirrors is configured by a sum of a positive component in the first direction and a negative component in a second direction perpendicular to the first direction,
   wherein the normal vectors are substantially parallel to each other, and
   wherein, with $0 \leq \theta_0 \leq 90°$, when an average of angles which are formed by the-normal vectors and a direction opposite to the second direction is referred to as $\theta_0$, an average of refractive indices of substrates of the dichroic mirrors is referred to as no, an average of widths of the substrates of the dichroic mirrors is referred to as $\alpha$, an average of thicknesses of the substrates of the dichroic mirrors is referred to as $\beta$, and an average of intervals between the dichroic mirrors is referred to as x, and with $2 \leq n \leq N$, when an average of distances by which an end of the nth dichroic mirror in the second direction is shifted in the direction opposite to the second direction with respect to an end of the (n−1)th dichroic mirror in the second direction is referred to as yz, $\Delta s$, $\phi m(\Delta s)$, N, $\theta_0$, $n_0$, $\alpha$, $\beta$, x, and yz satisfy a predetermined relationship such that at least one light beam is detected by the sensor through the dichroic-mirror array.

7. The light detection apparatus according to claim 6, wherein, when $\theta_1 = \sin^{-1}(1/n_0\times\sin\theta_0)$, $\theta_2 = \sin^{-1}(1/n_0\times\sin(90°-\theta_0))$, $a_W = \cos\theta_0$, $b_W = -\cos\theta_0\times\tan\theta_1$, $a_L = (N-1)\times\cos\theta_0 + \sin\theta_0$, and $b_L = (N-2)/\cos\theta_0\times(2\times\sin(90°-\theta_0-\theta_2) + 1 - \sin(\theta_0+\theta_2)) + (N-2)\times\sin\theta_0 + 2\times\cos\theta_0$, $(\sin\theta_0 - b_W/a_W\times\cos\theta_0)\times\beta + \cos\theta_0/a_W \times \phi m(\Delta s) \leq x \leq (\sin\theta_0 - b_L/a_L \times \cos\theta_0)\times\beta + \cos\theta_0/a_L\times\Delta s$ is satisfied.

8. The light detection apparatus according to claim 6, wherein, when $\theta_2 = \sin^{-1}(1/n_0\times\sin(90°-\theta_0))$, $0 \leq yz \leq 2\times\sin(90°-\theta_0-\theta_2)/\cos\theta_2 \times \beta$ is satisfied.

9. The light detection apparatus according to claim 6, wherein, with $\theta_2 = \sin^{-1}(1/n_0\times\sin(90°-\theta_0))$, when n=2, $0 \leq yz \leq 2\times\cos\theta_0 \times \beta$ is satisfied, and when $3 \leq n \leq N$, $0 \leq yz \leq 2\times\sin(90°-\theta_0-\theta_2)/\cos\theta_2 \times \beta$ is satisfied.

10. The light detection apparatus according to claim 6, wherein $\cos\theta_0 \times \alpha \leq x \leq \cos\theta_0 \times \alpha + 2 \times \sin\theta_0 \times \beta$ is satisfied.

11. The light detection apparatus according to claim 6,
    wherein the light beam is incident to the dichroic-mirror array along the second direction,
    wherein the light beam is divided into N light beams different from each other along the first direction by the dichroic-mirror array and the N light beams are emitted along the second direction from the dichroic-mirror array, and
    wherein the N light beams are incident on the sensor in parallel and are simultaneously detected.

12. The light detection apparatus according to claim 11,
    wherein the light beam is composed of M light beams that are arranged in a third direction perpendicular to both the first direction and the second direction,
    wherein the M light beams are incident to the dichroic-mirror array in parallel along the second direction,
    wherein the M light beams are divided respectively into N light beams different from each other along the first direction by the dichroic-mirror array and the M×N light beams are emitted along the second direction from the dichroic-mirror array, and
    wherein the M×N light beams are incident on the sensor in parallel and are simultaneously detected.

13. A light detection apparatus comprising:
    a condensing-lens array in which M condensing lenses are arranged individually condense lights emitted from a light-emission-point array in which M light-emission points are arranged to form M light beams, with $M \geq 1$;
    a dichroic-mirror array in which N dichroic mirrors are arranged with $N \geq 2$; and
    a sensor,
    wherein the dichroic-mirror array is configured by arranging a plurality of dichroic mirrors of numbers 1, 2, ..., N in a numerical order in a first direction, wherein each of N normal vectors on front surfaces of the N dichroic mirrors is configured by a sum of a positive component in the first direction and a negative component in a second direction perpendicular to the first direction, wherein the N normal vectors are substantially parallel to each other, wherein each of arrangement directions of the light-emission-point array and the condensing-lens array is a third direction perpendicular to both the first direction and the second direction, wherein, an average of effective diameters of the M light-emission points is referred to as d, an average of focal lengths of the M condensing lenses is referred to as f, an average of effective diameters of the M condensing lenses is referred to as D, an average of intervals between the M condensing lenses is referred to as p in a case where M≥2, an average of maximum optical path lengths between the M condensing lenses and the sensor is referred to as g, with $0 \leq \theta_0 \leq 90°$, when an average of angles which are formed by the N normal vectors and a direction opposite to the second direction is referred to as $\theta_0$, an average of refractive indices of substrates of the N dichroic mirrors is referred to as $n_0$, an average of widths of the substrates of the N dichroic mirrors is referred to as α, an average of thicknesses of the substrates of the N dichroic mirrors is referred to as β, and an average of intervals between the N dichroic mirrors is referred to as x, and with 2≤n≤N, when an average of distances by which an end of the nth dichroic mirror in the second direction is shifted in the direction opposite to the second direction with respect to an end of the (n−1)th dichroic mirror in the second direction is referred to as yz, d, f, D, p, g, $\theta_0$, N, $n_0$, α, β, x, and yz satisfy a predetermined relationship such that the M light beams are detected by the sensor through the dichroic-mirror array.

14. The light detection apparatus according to claim 13, wherein the M light beams are incident to the dichroic-mirror array in parallel along the second direction, wherein the M light beams are divided respectively into N light beams different from each other along the first direction by the dichroic-mirror array and the M×N light beams are emitted along the second direction from the dichroic-mirror array, and wherein the M×N light beams are incident on the sensor in parallel and are simultaneously detected.

15. The light detection apparatus according to claim 13, wherein, when $\theta_1 = \sin^{-1}(1/n_0 \times \sin \theta_0)$, $\theta_2 = \sin^{-1}(1/n_0 \times \sin(90° - \theta_0))$, $a_W = \cos \theta_0$, $b_W = -\cos \theta_0 \times \tan \theta_1$, $a_L = (N-1) \times \cos \theta_0 + \sin \theta_0$, $b_L = (N-2)/\cos \theta_0 \times x(2 \times \sin(90° - \theta_0 - \theta_2) + 1 - \sin(\theta_0 + \theta_2)) + (N-2) \times \sin \theta_0 + 2 \times \cos \theta_0$, and $d' = (g-f)/f \times d$, $(\sin \theta_0 - b_W/a_W \times \cos \theta_0) \times \beta + \cos \theta_0/a_W \times D \leq x$ is satisfied, and $(\sin \theta_0 - b_W/a_W \times \cos \theta_0) \times \beta + \cos \theta_0/a_W \times d' \times (\sin \theta_0 - b_L/a_L \times \cos \theta_0) \times \beta + \cos \theta_0/a_L \times g$ is satisfied.

16. The light detection apparatus according to claim 13, wherein, when $\theta_2 = \sin^{-1}(1/n_0 \times \sin(90° - \theta_0))$, $0 \leq yz \leq 2 \times \sin(90° - \theta_0 - \theta_2)/\cos \theta_2 \times \beta$ is satisfied.

17. The light detection apparatus according to claim 13, wherein, with $\theta_2 = \sin^{-1}(1/n_0 \times \sin(90° - \theta_0))$, when n=2, $0 \leq yz \leq 2 \times \cos \theta_0 \times \beta$ is satisfied, and when 3≤n≤N, $0 \leq yz \leq 2 \times \sin(90° - \theta_0 - \theta_2)/\cos \theta_2 \times \beta$ is satisfied.

18. The light detection apparatus according to claim 13, wherein $\cos \theta_0 - \alpha \leq x \leq \cos \theta_0 \times \alpha + 2 - \sin \theta_0 \times \beta$ is satisfied.

19. The light detection apparatus according to claim 13, wherein, when M≥2, $f \geq 1/((2 \times p)/(1.27 \times d) + 1) \times g$ is satisfied.

20. The light detection apparatus according to claim 13, wherein, when M≥2, $f \geq 1/(p/d + 1) \times g$ is satisfied.

* * * * *